US010511438B2

(12) United States Patent
Murdoch

(10) Patent No.: US 10,511,438 B2
(45) Date of Patent: Dec. 17, 2019

(54) METHOD, SYSTEM AND APPARATUS USING FORWARD-SECURE CRYPTOGRAPHY FOR PASSCODE VERIFICATION

(71) Applicant: ONESPAN NORTH AMERICA INC., Chicago, IL (US)

(72) Inventor: Steven Murdoch, Cambridge (GB)

(73) Assignee: OneSpan North America Inc., Chicago, IL (US)

( * ) Notice: Subject to any disclaimer, the term of this patent is extended or adjusted under 35 U.S.C. 154(b) by 294 days.

(21) Appl. No.: 15/395,659

(22) Filed: Dec. 30, 2016

(65) Prior Publication Data

US 2017/0195316 A1    Jul. 6, 2017

Related U.S. Application Data

(60) Provisional application No. 62/273,138, filed on Dec. 30, 2015.

(51) Int. Cl.
*H04L 29/06* (2006.01)
*H04L 9/08* (2006.01)
*H04L 9/32* (2006.01)

(52) U.S. Cl.
CPC .......... *H04L 9/0863* (2013.01); *H04L 9/0877* (2013.01); *H04L 9/3228* (2013.01); *H04L 9/3234* (2013.01); *H04L 63/067* (2013.01); *H04L 63/0838* (2013.01); *H04L 63/0853* (2013.01); *H04L 2209/04* (2013.01)

(58) Field of Classification Search
None
See application file for complete search history.

(56) References Cited

U.S. PATENT DOCUMENTS

| | | | |
|---|---|---|---|
| 8,832,807 B1 * | 9/2014 | Kuo | G06F 21/45 |
| | | | 713/183 |
| 2009/0210712 A1 | 8/2009 | Fort | |
| 2014/0189359 A1 * | 7/2014 | Marien | H04L 9/3228 |
| | | | 713/172 |

FOREIGN PATENT DOCUMENTS

WO    WO 2012/005744    1/2012

OTHER PUBLICATIONS

International Preliminary Report on Patentability and Written Opinion for International Application No. PCT/US2016/069464, dated Jul. 3, 2018, 8 pages.
International Search Report and Written Opinion for PCT/US2016/069464 dated Apr. 6, 2017.
Bellare et al., "Forward-Security in Private-Key Cryptography," Springer-Verlag Berlin Heidelberg 2003, LNCS 2612, pp. 1-18.

* cited by examiner

*Primary Examiner* — Andrew J Steinle
(74) *Attorney, Agent, or Firm* — Culhane Meadows PLLC; Stephen J. Weed

(57) ABSTRACT

Methods, apparatus, and systems using dynamic authentication credentials to secure interactions between a user and a computer-based application are disclosed. Dynamic authentication credentials are generated based on a passcode value and a passcode-blinding data element value. The passcode and the passcode-blinding data element values are used to calculate a passcode verifier data element value. The passcode verifier data element value is then used to calculate the dynamic authentication credentials.

45 Claims, 4 Drawing Sheets

METHOD, SYSTEM AND APPARATUS USING FORWARD-SECURE CRYPTOGRAPHY FOR PASSCODE VERIFICATION

CROSS REFERENCE TO RELATED APPLICATIONS

This application claims priority to U.S. Provisional Application Ser. No. 62/273,138 filed Dec. 30, 2015, the contents of such application being incorporated by reference herein.

FIELD OF THE INVENTION

The invention relates to securing remote access to computers and applications and remote transactions over computer networks. More specifically, the invention relates to methods, apparatus and systems for using a secret passcode with a two-factor authentication token.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

One solution to secure the interaction of users with computer based applications is the usage of two-factor strong authentication solutions.

In two-factor authentication solutions, a user may be authenticated to, for example, a computer based application by a person claiming to be the legitimate user providing to an authentication verifying entity proof of two authentication factors. A first factor (the 'what the user has' factor) consists of a proof that the user possesses or has access to a specific object or token that may be linked or associated with a particular user. A second factor may consist of a proof that the user has knowledge of a specific piece of information that may be linked or associated with a particular user (the 'what the user knows' factor). This specific piece of information may comprise a secret that may be assumed to be known by no other person than the legitimate user, such as a secret password or a secret PIN (Personal Identification Number). This specific piece of information may be referred to in the remainder of this description as a passcode.

To ensure the security of authentication solutions using a passcode, it is essential that the confidentiality of the passcode is ensured and maintained at all times.

What is needed is a secure solution for protecting the secrecy and confidentiality of passcodes that are used with two-factor strong authentication solutions.

DISCLOSURE OF THE INVENTION

The invention is based on an insight of the inventors that client and server devices that are used for authentication purposes may be hacked so that information stored on these devices may fall in the hands of fraudsters. If this stolen information is related to passcodes that users may use when authenticating to a computer based application, a risk exists that this stolen information may be used by some fraudulent party to extract knowledge about these passcodes, for example to retrieve the passcodes themselves. Since in some cases a user may use the same or similar passcodes across multiple platforms and applications, the damage that could arise from the discovery by malicious parties of such passcodes may extend well beyond the single computer based application. It may for example in practice be difficult to exclude that users of an internet banking application will choose a passcode for authenticating to that internet banking application that is identical or very similar to the PIN of one of their bank cards.

It is an insight of the inventors that the overall security of an authentication solution based on the usage of a passcode may be increased if neither the client devices nor the server devices permanently store any information that may permit an attacker to retrieve the value of a passcode or to constrain the range of possible values of a passcode. For example, in some embodiments of the invention neither the client devices nor the server devices may permanently store a passcode value or a data element that is calculated in a reversible way from a passcode value. In this description client devices may also be referred to as clients, authentication clients, authentication tokens or strong authentication tokens.

The functioning of a strong authentication token according to the invention:

In some embodiments the strong authentication token may be adapted to generate dynamic credentials such as a one-time password (OTP) or an electronic signature by cryptographically combining a value of a passcode verifier data element with the value of a dynamic variable and the value of a secret cryptographic key and using a cryptographic algorithm that is parameterized with the secret cryptographic key.

In some embodiments the strong authentication token may be adapted to calculate the value of the passcode verifier data element by prompting the user to provide a passcode and by combining the passcode value provided by the user with the value of a passcode-blinding data element. In some embodiments the passcode-blinding data element may be stored by the authentication token, e.g., in some form of permanent or non-volatile memory accessible by the authentication token. In some embodiments the passcode value provided by the user may be combined with the value of a stored passcode-blinding data element by using a function such as a cryptographic one-way function which may for example comprise a cryptographic hashing function. In some embodiments the passcode-blinding data element may be generated once by the strong authentication token and may then be stored by the strong authentication token for future use. In some embodiments the strong authentication token may generate the passcode-blinding data element in an unpredictable way. In some embodiments the strong authentication token may generate the passcode-blinding data element in a way that is independent of the value of the passcode. For example, in some embodiments the strong authentication token may generate the passcode-blinding data element using a random number generator or a pseudo-random number generator. In some embodiments the passcode-blinding data element may comprise a random number that has been generated by a random number generator or a pseudo-random number generator. In some embodiments the strong authentication token may be adapted to erase from its memory any (temporary) copy of the passcode value that the user provided once the strong authentication token has used the passcode value to calculate the value of the passcode verifier data element. Also, in some embodiments the strong authentication token may be adapted to erase from its memory any (temporary) copy of the calculated passcode verifier data element once the strong authentication token has used the calculated passcode verifier data element to generate a dynamic authentication credential.

In some embodiments the dynamic variable may be a function of a time value (that may for example be provided by a clock of the strong authentication token such as a personal computing device on which a software token may be running). In some embodiments the dynamic variable may be a function of the value of an event related variable. In this description the terminology event related variable may refer to a variable the value of which may be automatically updated using an update algorithm upon the occurrence of a specific event. In some embodiments the strong authentication token may, upon the occurrence of a specific event, calculate a new value for the event related variable as a function of the current value of that event related variable and may replace the current value by the calculated new value. In some embodiments the specific event may for example comprise the usage by the strong authentication token of the event related variable to generate an OTP or electronic signature. In some embodiments the event related variable may comprise a counter and the update algorithm may comprise the monotonic incrementing (or decrementing) of the counter. In some embodiments the update algorithm may comprise for example a one-way hashing algorithm and the event related variable may be updated with a new value that is obtained as the result of applying the one-way hashing algorithm to the old value of the event related variable. In some embodiments the event related variable may comprise the secret cryptographic key or a secret cryptographic key used in the generation of a dynamic credential may be derived from an event related variable. For example, in some embodiments the value of the secret cryptographic key may be updated with a new value, that may be a function of a previous value of the secret cryptographic key, each time the secret cryptographic key is used to generate an OTP or electronic signature. In some embodiments the event related variable may comprise a state variable and the value of the secret cryptographic key may be calculated as a function of that state variable, which may be updated, upon the occurrence of a specific event, with a new value that may be a function of the current value of that state variable. In some embodiments the dynamic variable may be based on a challenge that may for example be generated by a server and that may for example be provided to the strong authentication token (e.g. by the user entering the challenge using a user input interface of the electronic device that comprises the strong authentication token). In some embodiments the dynamic variable may be based on transaction data that may be provided to the strong authentication token (e.g. by the user entering the transaction data using a user input interface of the strong authentication token). In some embodiments the dynamic variable may comprise any combination of the above described types of dynamic variables.

The result of the cryptographic combination of the value of the passcode verifier data element with the dynamic variable and the value of the secret cryptographic key may be in general referred to as a dynamic credential or a dynamic authentication credential. In case the dynamic variable is based on transaction data the result of the cryptographic combination of the value of the dynamic variable with the value of the passcode verifier data element and the value of the secret cryptographic key may be referred to as an electronic signature. In case the dynamic variable is based on a challenge the result of the cryptographic combination of the value of the dynamic variable with the value of the passcode verifier data element and the value of the secret cryptographic key may be referred to as a response. In case the dynamic variable is based on data that are internally generated and/or maintained by the strong authentication token, such as may be the case with a time value or the value of an event related variable, the result of the cryptographic combination of the value of the dynamic variable with the value of the passcode verifier data element and the value of the secret cryptographic key may be referred to as a one-time password (OTP).

In some embodiments the cryptographic algorithm for cryptographically combining the value of the passcode verifier data element with the value of the dynamic variable and the value of the secret cryptographic key may comprise a symmetric cryptographic algorithm that may be parameterized by the secret cryptographic key, and the strong authentication token may share the secret cryptographic key with for example an authentication server. For example, in some embodiments the symmetric cryptographic algorithm may comprise a symmetric encryption or decryption algorithm such as AES (Advanced Encryption Standard) that may operate on the value of the dynamic variable and that may be parameterized with the secret cryptographic key. In some embodiments the symmetric cryptographic algorithm may comprise a keyed hashing algorithm such as HMAC (Hash-based Message Authentication Code) that may operate on, the value of the dynamic variable and that may be parameterized with the secret cryptographic key.

Software and Hardware Tokens:

In some embodiments a strong authentication token may take the form of a software application installed and running on a personal general purpose electronic computing device belonging to a user, such as a Personal Computer (PC), a tablet computer or a smartphone, whereby the software application may be adapted to provide authentication services for a legitimate user of the authentication software application.

In some embodiments a strong authentication token may comprise a dedicated electronic hardware device the primary or only function of which is to provide authentication services for a legitimate user of the device.

These authentication services may comprise generating dynamic credentials for securing interaction between a user and a computer based application such as authenticating the user to a remote computer based application and/or securing transactions submitted by the user to a remote computer based application, as is explained in more detail elsewhere in this description.

General Principles of Some Embodiments

In some embodiments an authentication protocol according to the invention may use a sequence of cryptographic keys that are generated from a dynamic state, wherein the state is updated such that the new states can be found from old states, but not vice versa. The current value of the state may be maintained in a synchronized way by both the authentication client (such as a strong authentication token) and an authentication server. For example, in some embodiments a forward-secure key-updating algorithm may be used to construct a sequence of keys and/or states. In some embodiments an authentication token may cryptographically combine a passcode, which may have been provided to the authentication token by a user of the authentication token, with such a cryptographic key to generate an authentication credential. In some embodiments the cryptographic key that is used in the generation of the authentication credential may be derived by the strong authentication token from the current value of such state which may be updated by the strong authentication token, e.g., each time after the strong authentication token has generated an authentication credential.

In some embodiments the passcode is not used directly, but only to create a "passcode verifier", which is formed from the passcode and a passcode-blinding data element. The passcode-blinding data element may be obtained, e.g. generated, by the authentication token during an initialization stage and may be permanently stored on the authentication token, and only on the authentication token, for future use e.g., for the generation of a passcode verifier value from a passcode value. The passcode verifier may be generated using a one-way function such that the passcode value cannot be calculated by applying a reverse function to the resulting passcode verifier. The passcode-blinding data element may have a high entropy and the passcode verifier may be generated such that it also has a high entropy, such that it may be infeasible in practice to retrieve, by a brute force attack, the actual passcode value from the passcode verifier if the passcode-blinding data element is not known. For example, the passcode verifier may be calculated by the authentication token by applying a hash function, preferably a cryptographically secure hash function such as SHA-256, to a combination, such as a concatenation, of the passcode value and the passcode-blinding data element. The passcode-blinding data element may have been generated by a true or pseudo random number generator. In some embodiments the passcode-blinding number may be generated on the basis of true or pseudo random data generated by the authentication token. In some embodiments the passcode-blinding number may be generated on the basis of true or pseudo random data generated by an authentication server. In some embodiments the passcode-blinding number may be generated on the basis of a combination of true or pseudo random data generated by the authentication token and true or pseudo random data generated by an authentication server. The actual passcode may be erased from the authentication token every time it has been used and immediately after it has been used. At an initialization stage the passcode verifier may have been transferred in a secure way to a verification or authentication server and may be permanently stored on the verification or authentication server, and only on the verification or authentication token, for future use e.g., for the verification of a dynamic authentication credential generated by the authentication token.

In some embodiments each generated dynamic authentication credential may be an HMAC under a key which is updated for each generated credential. One of the inputs to the HMAC may be the passcode verifier. After the credential has been verified the old key may be discarded and the state may be updated. In this way the verification server cannot learn the passcode (it only has a copy of the passcode verifier, and not the passcode data element so that the actual passcode value cannot be retrieved from applying a brute force attack on the copy of the passcode verifier held at the server).

The authentication token never stores the passcode, so extracting information from the authentication token won't allow the passcode to be discovered (although the passcode-blinding data element is stored on the authentication token, it can't be used to retrieve the value of the passcode by a brute force attack without knowledge of the passcode verifier).

Also, given an old credential and the current state of the authentication token the passcode cannot be discovered because the key necessary to test a candidate passcode has been destroyed both by the server and client.

Other aspects of the protocol, system and method of the invention may be related to how to keep the server and client in sync, which may be by following certain rules as to when to update the state. More details of these aspects are described elsewhere in this description.

In some embodiments the techniques described in this description may also apply to any sensitive user authentication related data which should remain secret and may be vulnerable to brute force attacks e.g. because they may have a low entropy. For example, these techniques may also be applied to PINs, passwords and biometric templates, which could all be examples of a passcode.

Particular Embodiments

In the following paragraphs a particular set of embodiments of the invention will be described.

Terminology and Definitions

PRNG(length): a bit string of 'length' bits from a cryptographically secure random number generator, which may comprise a true random number generator or a pseudo random number generator.

IENCODE(i, length): denotes a bit string that is the result of encoding the number 'I' as big-endian integer and left-pad with zeros to 'length' bits.

< >: denotes a zero length byte string.

{a, b, c, . . . }: denotes the result of concatenating the bit strings 'a', 'b', 'c', . . . in the given order.

S: unless otherwise specified, refers to the authentication server and may also indicate an action or step performed by the authentication server.

C: unless otherwise specified, refers to an authentication client such as the authentication token or authentication client application, and may also indicate an action or step performed by the authentication client.

The expression "Sender→Receiver: Message" means that the bit string 'Message' is sent from the entity 'Sender' to the entity 'Receiver'. It may further imply the generation by the entity 'Sender' of the bit string 'Message' prior to the transfer of 'Message' from 'Sender' to 'Receiver'.

Cryptographic Primitives:

Encryption Primitive:

The expression "ciphertext=ENC(K, IV, Data)" denotes encrypting the bit string 'Data' to obtain the result 'ciphertext' using a cryptographic encryption algorithm parameterized with the cryptographic encryption key 'K' using (if applicable for the chosen encryption algorithm) the initialization vector 'IV'. In some embodiments the encryption algorithm may comprise a symmetric encryption algorithm. In some embodiments the symmetric encryption algorithm may comprise a block cipher such as AES (Advanced Encryption Standard) or 3DES (Triple Data Encryption Standard) in some encryption mode. For example in some embodiments the AES algorithm may be used in the CTR-mode (Counter mode, see also: the website located at web address en.wikipedia.org/wiki/Block_cipher_mode_of_operation#CTR which is herein incorporated by reference)

and the key K may have a size of 128-bit and the starting value of the counter for the CTR-mode may be calculated from the initialization vector. In some embodiments the starting value of the counter for the CTR-mode may be calculated as the initialization vector left shifted over a number of positions, e.g. IV<<64. In some embodiments the initialization vector may be calculated from a counter 'CTR' and a random number. For example the initialization vector may be calculated as a function of the counter 'CTR' as follows: IV(CTR)={IENCODE(CTR, 6×8), PRNG(2×8)}.

Credential Generation Primitive:

In some embodiments a credential may be calculated using a key 'K' and an input bit string 'Data' using a cryptographic function using as inputs the key 'K' and the bit string 'Data'. For example, in some embodiments the credential may be calculated as a message authentication code (MAC) using as inputs the key 'K' and the bit string 'Data'. In some embodiments the cryptographic function for calculating the credential may comprise a encryption (or decryption) of the bit string 'Data' under the key 'K'. In some embodiments the cryptographic function for calculating the credential may comprise a one-way function. In some embodiments the one-way function may comprise a cryptographic hash function. In some embodiments the one-way function may comprise a keyed hash function. For example in some embodiments the credential may be calculated as MAC=HMAC(K, Data), whereby HMAC denotes a Hash-based Message Authentication Code of Data under the key K, such as the HMAC specified by RFC 2104, or a SHA-256 HMAC as specified by RFC4231. In some embodiments the key K may have a size of 128 bits. In some embodiments the resulting cryptogram, hash or MAC may be truncated. In some embodiments, if Data is not a multiple of 8 bits, then it may be left zero-padded to the next byte-boundary.

Key updating primitive:

The expression "$state_{i+1}$, $key_{i+1}$=UPDATE($state_i$)" denotes updating the values of a key and a state by using some cryptographic key and state updating algorithm to calculate the new values '$key_{i+1}$' for the key and '$state_{i+1}$' for the state starting from the old value '$state_i$' of the state, and replacing (if applicable) the old values for the key and the state by the newly calculated values. In some embodiments the new value of the state may be calculated from the current value of the state using a first irreversible function that takes the current value of the state as an input. In some embodiments the new value of the cryptographic key may be calculated from the current value of the state using a second irreversible function that takes the current value of the state as an input. In some embodiments the irreversible functions for calculating the new values of the state and the cryptographic key from the current value of the state, may comprise for example a secure cryptographic hash function. In some embodiments the cryptographic key and state updating algorithm may comprise a key updating algorithm such as the key updating algorithm disclosed in "Forward-Security in Private-Key Cryptography" by Mihir Bellare and Bennet Yee, Springer LNCS 2612. In some embodiments the cryptographic key and state updating algorithm may be defined as:

$key_{i+1}$=ENC($state_i$, IV_1, Data_1) where in a specific embodiment Data_1 may consist of the 16 bytes 0x00 . . . 0x00 and IV_1 may have the value 0
$STATE_{I+1}$=ENC($STATE_i$, IV_2, DATA_2) WHERE IN A SPECIFIC EMBODIMENT Data_2 may consist of the 16 bytes 0x00 . . . 0x00 and IV_2 may have the value 263.

Constants:

In some embodiments a number of constants may be used. For example, in some embodiments the following constants may be used: VERSION, MSG_CHALLENGE, MSG_RESPONSE, MSG_ACTIVATION_CHALLENGE, MSG_ACTIVATION_RESPONSE, wherein the latter four constants may have values that are all different from each other. In a particular embodiment these constants may have the following values:
 VERSION:=IENCODE(0, 8)
 MSG_CHALLENGE:=IENCODE(1, 4)
 MSG_RESPONSE:=IENCODE(2, 4)
 MSG_ACTIVATION_CHALLENGE:=IENCODE(3, 4)
 MSG_ACTIVATION_RESPONSE:=IENCODE(4, 4)

Parameters and Initial Configuration:

All parameters are for a particular authentication token—server combination. The data retrieved by the server for a particular authentication token may correspond to a particular user account that is being or has been logged in to. The data retrieved by the server may correspond to the particular authentication token or the particular instance of the authentication application launched.

| Server (S) | Client (C) | Purpose |
|---|---|---|
| Transaction counter CS:=0 | Transaction counter CC:=0 | Generating unique IV for encryption; detecting replay attacks |
| Challenge MAC key $KS_{MAC}$:=PRNG(128) | Challenge MAC key $KC_{MAC}$:=$KS_{MAC}$ | Authenticating challenge messages |
| Encryption key $KS_{ENC}$:=PRNG(128) | Encryption key $KC_{ENC}$:=$KS_{ENC}$ | Encrypting challenge messages |
| Response state $SS_{RES}$:=PRNG(128) | Response state $SC_{RES}$:=$SS_{RES}$ | Generating key for authenticating responses |
| Activation MAC key $KS_{ACT}$:=PRNG(128) | Activation MAC key $KC_{ACT}$:=$KS_{ACT}$ | Authenticating activation responses |
| Passcode verifier $P_V$:=< > | Passcode-blinding random number $P_R$:=< > | Authenticating user without server knowing the passcode |
| Service ID $IDS_S$:=unique value for each service provider (10 bits) | Service ID $IDC_S$:=$IDS_S$ | Showing a helpful error message if the wrong application is used |
| User ID $IDS_U$:=unique value for each customer of a given service provider (22 bits) | User ID $IDC_U$:=$IDS_U$ | Showing a helpful error message if if the wrong client is used |
| Activation encryption key $KT_{ACT}$:=some value with high entropy | | Temporary key during activation process |

Assumptions and Notes:

In some embodiments it may be assumed that the attacker may control a network for passing messages between the authentication token and the server, and may be capable of mounting a full MitM (Man-in-the-Middle) attack. In some embodiments it may also be assumed that the authentication token or application is secure. In some embodiments it may also be assumed that the server is secure.

In some embodiments, the authentication token may be implemented using secure hardware, and the authentication token may be able to MAC and/or decrypt arbitrary messages but may not release keys. In such embodiments it may be advantageous if a nonce is included in messages. An attacker with only temporary access to the authentication token cannot predict nonces for any future transactions.

Pre-Activation of the Client:

In some embodiments, the following data elements may be generated by the server as indicated above, and, during a pre-activation of the client, may be transferred from the server to the client: Challenge MAC key, KCMAC:=KSMAC, Encryption key KCENC:=KSENC, Response state SCRES:=SSRES, Activation MAC key KCACT:=KSACT Activation Sub-Protocol:

Summary:

In some embodiments the initial state of an authentication token or application may be as shown above. Before transaction signing or dynamic credential generation can be performed, it may be necessary to activate the authentication token or application. In some embodiments activation may be performed only once, but it may be closely related to passcode changing. The end result of the activation may be that on the one hand the server may have a copy of the passcode verifier (PV), and on the other hand the client may have stored a corresponding value of the passcode-blinding data element (PR). This step may be performed so that the server does not get to know the user's passcode, but can verify whether it was entered correctly for the generation of a credential that may have been received by the server. The response message from the client, which may comprise the value of the passcode verifier, may be encrypted under a forward secure key so that if someone steals the authentication token, which may for example comprise a smartphone, and has observed a credential generated by the authentication token, they cannot guess the user's passcode.

Details:

In some embodiments the user may contact the server, and may initiate the activation procedure. The activation procedure or activation protocol may comprise the following steps:

Step 1: In some embodiments an activation message may be generated by the server and transferred from the server to the client as follows:

S→C: {Version, Service ID, User ID, IV,
ENC(KSENC, IV, {Transaction, Type, Nonce, Activation_MAC})} where:

Version=VERSION
Service ID=IDSS
User ID=IDSU
IV=IV(CS)
Transaction=IENCODE(0, 212)
Type=MSG_ACTIVATION_CHALLENGE
Nonce=PRNG(128)
Activation_MAC=HMAC(KSMAC, {Version, Type, Transaction, Nonce, IV}); in some embodiments the Activation_MAC may be truncated to 64 bits Step 2: the key KTACT and the state SSRES may be updated on the server

S: SSRES, KTACT:=UPDATE(SSRES)

Step 3: the client may receive and decode the activation message.

Step 4: the client may verify whether IDCU is equal to IDSU. If IDCU!=IDSU then the client may show an error message and exit.

Step 5: the Client may decrypt the encrypted part of the activation message and may verify the Activation_MAC; the client may exit if this fails.

Step 6: The client may extract the counter from the initial vector IV and if that counter (extracted from IV)<=last known value of the counter, or >last known value of the counter+100, the client may abort.

Step 7: The client may obtain the passcode-blinding data element. For example, if the client doesn't yet have a value of the passcode-blinding data element, it may generate the passcode-blinding data element as a random number. For example, in a particular embodiment: C: If PR==< > then PR:=PRNG(128)

Step 8: The client may prompt the user to provide the value of the passcode and may capture the passcode provided by the user. In some embodiments the user may be prompted to provide the passcode twice for confirmation and the client may be adapted to verify that the two values of the passcode provided by the user are consistent.

Step 9: The state and the key may be updated on the client (this may be repeated depending on the difference between the value for the counter extracted from IV and the last known value of the counter):

C: SCRES, K:=UPDATE(SCRES)

Step 10: Response generated:

C→S: ENC(K, 0, {V, HMAC(KCACT, {Version, Type, Transaction, V})

where:

Version=VERSION
Type=MSG_ACTIVATION_RESPONSE
Transaction=IENCODE(0, 212)
V=HMAC(PR,passcode) (truncated to 30 bits)
HMAC(KCACT, msg) is truncated to 15 bits Step 11: 5: Server may decrypt response with KTACT, and may verify it with KCACT, and may set PV: =V Authentication Sub-Protocol:

Summary:

This authentication sub-protocol may be performed to allow users to authenticate themselves or to authorize a particular transaction. The result may for example be that the server, upon successful verification of the authentication credential provided by the user, concludes that the user has seen the correct transaction details and has entered the correct passcode. The server should not know the passcode itself. An eavesdropper who records all communication should not be able to get the passcode, even after stealing the phone (since the MAC key is discarded after use).

Details:

Step 1: In some embodiments the user may contact the server and may initiate an authentication or transaction.

Step 2: The client may obtain the value of a dynamic variable. In some embodiments the value of the dynamic variable may be based on a counter maintained by the client. In some embodiments the client may synchronize its value of such a counter with the corresponding counter value maintained by the server. In some embodiments the value of the dynamic variable may be based on an external data element that the client may receive for example in a message from the server. The external data element may for example comprise a challenge and/or nonce which may be generated by the server. The external data element may for example also comprise transaction data representing a transaction to be authorized by the user. In some embodiments the server may authenticate the message, e.g., by adding a message authentication code (MAC). In some embodiments the server may also encrypt the server message. For example, in a particular embodiment, the server may generate and send a challenge message to the client as follows:

S→C: {Version, Service ID, User ID, IV,
ENC(KSENC, IV, {Transaction, Type, Nonce, Challenge_MAC})} where:

Version=VERSION
Service ID=IDSS
User ID=IDSU
IV=IV(CS)

Transaction=may comprise the encoded details of transaction to be authorized; in some cases 'Transaction' may be encoded with a (random) challenge that may be meaningless to the user, or it may be encoded with a pre-determined value, for example if the authentication sub-protocol is used for authenticating the user rather than for authorizing a particular transaction.

Type=MSG_CHALLENGE

Nonce=PRNG(128)

Challenge_MAC=HMAC(KSMAC, {Version, Type, Transaction, Nonce, IV}), truncated to 64 bits Step 3: The key K and the state SSRES may be updated on the server:

S: SSRES, K:=UPDATE(SSRES)

Step 4: The server may generate an expected response (which in some embodiments may be truncated to 30 bits), which may serve as a credential reference value to be compared with a authentication credential that the server may subsequently receive from the client:

S:E=HMAC(K, {Version, Type, Transaction, Nonce, IV, PV})

where:

Version=VERSION

Type=MSG_RESPONSE

Transaction, Nonce, IV are taken from the challenge message

Step 5: Client may decode the received challenge message

Step 6: C: If IDCU!=IDSU then show an error message and exit

Step 7: Client may decrypt the received challenge message and verify the Challenge_MAC to authenticate the source of the message. If this verification fails, then the client may abort.

Step 8: If counter (extracted from IV)<=last counter, or >last counter+100, then the client may abort.

Step 9a: The client may present to the user the transaction data encoded in Transaction and prompt the user to authorize the presented transaction data. If Transaction doesn't contain meaningful data (such as a hardcoded value, or a hash value) then this step may be skipped. If the user doesn't authorize the presented transaction data, the client may abort.

Step 9b: The client may prompt the user to provide the passcode. If the user doesn't provide the passcode, the client may abort. In some embodiments the user may implicitly indicate authorization (e.g. of the presented transaction data) by providing the passcode.

Step 10: the key K and the state SCRES may be updated on client (in order to synchronize the state of the client with the state of the server, this may be repeated a number of times based on the counter):

C: SCRES, K:=UPDATE(SCRES);

Step 11: The client may generate an authentication credential in response to receiving the challenge message from the server and the client may return the generated authentication credential to the server as follows:

C→S: HMAC(K, {Version, Type, Transaction, Nonce, IV, V}) where:

Version=VERSION (may be left zero-padded to 8 bits)

Type=MSG_RESPONSE

Transaction, Nonce, IV are taken from the challenge message V=HMAC(PR,passcode)

In some embodiments the generated credential may be truncated to 30 bits.

Step 12: the server may verify whether the authentication credential matches the expected response E. In some embodiments the server may generate a signal indicating whether the verification of the authentication credential was successful.

Possible Variants:

In some embodiments the User ID and/or the Service ID may be included into the MAC for completeness.

In some embodiments the message type may be moved to the start of the message, so that it can be used to decide how the remainder of the message should be decoded.

In some embodiments of the invention the passcode may comprise secret information provided by a user, such as for example a PIN or a password. In other embodiments the passcode may comprise other information that may be related to the user or that may be specific to the user and that may have a sensitive nature and should remain confidential, such as for example some kinds of biometric information.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
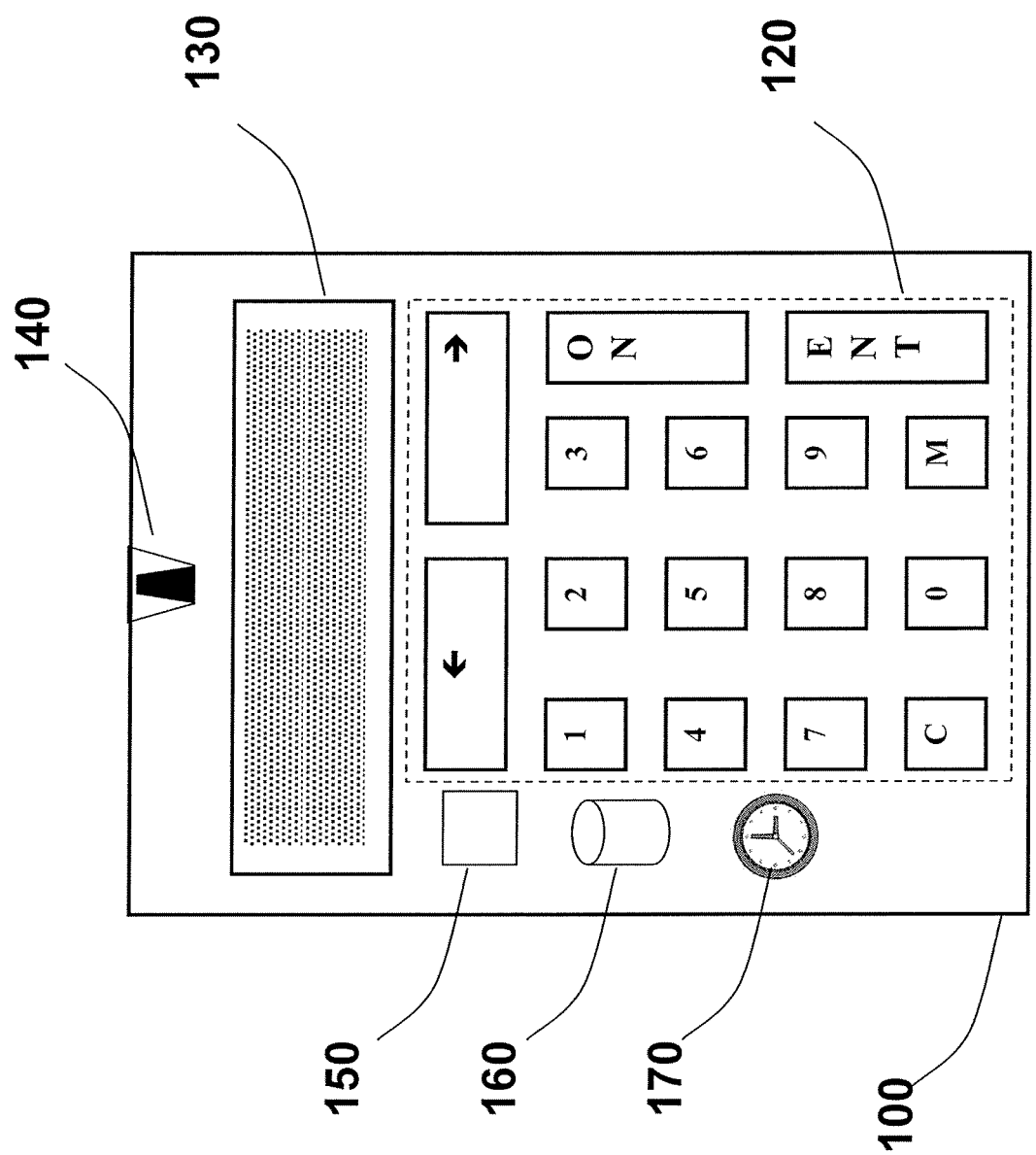
FIG. 1 schematically illustrates an exemplary apparatus according to an aspect of the invention.

FIG. 1 schematically illustrates an exemplary apparatus or token (100) of the invention according to an aspect of the invention.

In some embodiments the apparatus or token (100) may comprise a strong authentication token. In some embodiments the apparatus or token may for example comprise a dedicated electronic hardware device the primary or only function of which is to provide authentication services for a legitimate user of the device. In some embodiments the apparatus or token (100) may comprise a personal general computing device such as a PC (Personal Computer), a tablet computer, a smartphone, or a smart watch. In some embodiments the apparatus or token (100) may comprise any of the strong authentication tokens or authentication clients described in more detail elsewhere in this description. In some embodiments the apparatus or token (100) may be adapted to perform any of the method steps or actions performed by any of the strong authentication tokens or authentication clients described in more detail elsewhere in this description.

The apparatus or token (100) may comprise a human user input interface (120), a human user output interface (130), a data input interface (140), a data processor (150), a memory component (160), and a component (170) for providing the value of a dynamic variable.

Processor (150) and memory (160):

The token may comprise a digital data processing component (150) that may be adapted to execute a set of data processing instructions, e.g., to implement one or more of the functions attributed to any of the strong authentication tokens or authentication clients described in more detail elsewhere in this description. In some embodiments the data processing component (150) may comprise for example one or more microprocessors, microcontrollers, Digital Signal Processor (DSP) chips, Field Programmable Gate Arrays (FPGA), Application Specific Integrated Circuit ASIC), etcetera.

The token may comprise a memory component (160). The memory component (160) may be connected to the digital data processing component (150). In some embodiments the memory component may comprise a program memory component that is adapted to store software or firmware to be executed by the data processing component. In some embodiment the functionality that the token supports may be defined by the software or firmware stored in its memory.

In some embodiments the memory component (160) may comprise a data memory component that is adapted to permanently or temporarily store data. In some embodiments the data memory component may be adapted to securely store secret data such as cryptographic keys or a passcode-blinding data element. In some embodiments the data memory component may be adapted to store the data of multiple token instances.

The memory component may for example comprise RAM (Random Access Memory) memory, ROM (Read-Only Memory) memory, EPROM (Erasable Programmable Read-Only Memory) memory, one-time programmable memory, flash memory, solid-state memory, a hard-disk, etc.

The token may furthermore comprise a random or pseudo-random number generator that the token may use for example to generate a passcode-blinding data element.

User Interface (120, 130):

In some embodiments the strong authentication token may comprise a user interface (120, 130) to interact with a user e.g. to exchange data, information and/or commands with a user. The user interface (120, 130) may be connected to the digital data processing component (150).

In some embodiments the strong authentication token's user interface may comprise an output user interface (130) for presenting information and/or data (such as instructions or messages for the user, transaction data to be approved by the user, a dynamic credential generated by the strong authentication token) to a user of the strong authentication token. In some embodiments the output user interface may comprise for example a display (130) or an audio output interface. In some embodiments the strong authentication token's user interface may comprise an input user interface (120) for receiving inputs from a user such as for example input data (like a challenge or transaction data) or instructions (like a confirmation, authorization or cancellation) or a passcode. In some embodiments the input user interface may comprise for example a keyboard (120). In some embodiments the strong authentication token's user interface may comprise a touch screen which may be adapted to offer both the functions of a user output interface and a user input interface.

Data Input Interface (140):

In some embodiments the strong authentication token may comprise a digital data input interface. The data input interface (140) may be connected to the digital data processing component (150). In some embodiments the strong authentication token's digital data input interface may be adapted to receive digital data messages. In some embodiments the digital data input interface may for example comprise an internet connection. In some embodiments the digital data input interface may for example comprise a local wired data connection such as a Universal Serial Bus (USB) connection. In some embodiments the digital data input interface may comprise a local wireless data interface such as for example a BLUETOOTH or Wi-Fi interface. In some embodiments the digital data input interface may comprise a mobile data communication network interface. In some embodiments the strong authentication token may for example comprise a smartphone. In some embodiments the data input interface may comprise an optical image acquiring component (140). In some embodiments the optical image acquiring component may comprise a camera. In some embodiments the strong authentication token may be adapted to capture with the optical image acquiring component images that may be encoded with a digital data message. In some embodiments the image may comprise a two-dimensional barcode. In some embodiments the format of the image may be defined in a standard. For example in some embodiments the optical image may be a QR-code.

In other embodiments the digital data input interface may comprise an acoustical interface adapted to capture acoustical signals that may be encoded with messages or commands for the token. In some embodiments the acoustical interface may comprise a microphone. In some embodiments the acoustical interface may comprise an analogue-to-digital convertor to convert the analogue electronic signal into a digital signal that may be further processed by for example the digital data processing component discussed above.

In some embodiments the apparatus or token (100) may be adapted to use the data input interface (140) to receive any of the authentication messages, described in more detail elsewhere in this description, that may have been generated by an authentication server and sent to the apparatus or token, for example in the form of a two-dimensional barcode which, for example, may be displayed by an access device as explained in more detail elsewhere in this description.

Credential Generation:

The token may be adapted to generate dynamic credentials as explained in more detail elsewhere in this description. In some embodiments the data processing component (150) may be adapted to perform cryptographic calculations to generate the dynamic credentials. In some embodiments the token may be adapted to generate dynamic credentials using cryptographic keys that may be stored permanently or temporarily in the memory component (160) or that the token may derive from data stored permanently or temporarily in the memory component (160). In some embodiments the token may be adapted to generate dynamic credentials using data that is part of a token instance stored in the memory component (160). In some embodiments the token may be adapted to use a symmetric cryptographic algorithm to generate the dynamic credentials. In some embodiments this cryptographic algorithm for generating dynamic credentials may be parameterized with one or more symmetric secret cryptographic credential generation keys. In some embodiments the credential generation keys may be shared with a server such as for example a credential verification server or an authentication server.

In some embodiments the token may be adapted to generate dynamic credentials using a dynamic variable that may comprise an internal value provided by the token. For example, in some embodiments the token may comprise a clock (170) and the token may use as an internal value the time value provided by that clock. In some embodiments the token may maintain a counter and the token may be adapted to use the value of that counter as in internal value to generate a dynamic credential for that instance and update the value of that counter (e.g. by incrementing or decrementing) each time the token uses the value of that counter to generate a dynamic credential.

In some embodiments the token may be adapted to generate dynamic credentials using a dynamic variable that may comprise an external value provided to the token. In some embodiments such an external value may comprise a challenge or nonce generated by a server or transaction data to be signed. In some embodiments the external value may be manually provided to the token by the user by using the user input interface of the token. For example, the token may capture a challenge or transaction data the user may enter as a string of characters on a keyboard comprised in the token. In some embodiments the external value is provided comprised in a message or command that is received by the token by means of its data input interface.

In some embodiments the token may be adapted to present the generated dynamic credential to the user. For example, in some embodiments the token may display the generated dynamic credential as a string of readable characters on its display. In some embodiments the string may comprise only decimal characters. In other embodiments the string may comprise alphanumerical characters.

Secure Dedicated Hardware Token:

In some embodiments the token (100) may be a dedicated hardware device. In some embodiments the token may be dedicated to be used in methods to secure a user's access to an application (which may be a computer based or automated application) or to secure a user's interaction with such an application. In some embodiments the main goal of the authentication device is to be used in methods to secure a user's access to an application or to secure a user's interaction with such an application. In some embodiments, in order to guarantee the authentication device's dedication to its use as a security device, the authentication device may be adapted to make it impossible to alter its firmware. In some embodiments, in order to guarantee the authentication device's dedication to its use as a security device, any change to or update of its firmware is only possible through a secure firmware update protocol that is designed to ensure that only an authorised controlling trusted party can update or change the firmware of the authentication device. This enables the controlling trusted party to ensure that no firmware update happens which would undo or compromise the authentication device's dedication to its use in methods to secure a user's access to an application or to secure a user's interaction with such an application. Devices where the users can install extra software that is not authorized by a controlling trusted party cannot be considered dedicated devices. Devices the main purpose of which is to offer telecommunication facilities cannot be considered devices dedicated to be used in methods to secure a user's access to and interaction with an application. General purpose PCs, laptops, tablet computers and smartphones cannot be considered dedicated devices.

In some embodiments the token (100) is a secure hardware device. In some embodiments the secure hardware device is adapted to ensure detection of and/or resist to attempts to tamper with the secure hardware device. In some embodiments the housing of the secure hardware device is adapted to resist to opening the housing and/or to increase the probability that a user will notice attempts to open the housing through deformation of the housing (tamper evidence). In some embodiments parts that together make up the housing may be welded or glued together so that attempts to detach these parts will typically lead to obvious deformation of the housing. In some embodiments the secure hardware device comprises a switch that detects opening of the housing. In some embodiments the secure hardware device is adapted to take appropriate action upon detecting an attempt to tamper. In some embodiments the secure hardware device may erase certain sensitive data such as cryptographic keys, a passcode-blinding data element, or the secure hardware device may (possibly irreversibly) go into an error mode or cease to function upon detecting a presumed attempt to tamper with the secure hardware device.

The secure hardware device may have a secure user output interface (e.g. a secure display) and a secure user input interface (e.g. a secure keyboard). In some embodiments the secure hardware device has an output interface that is secure in that it is fully controlled by the secure hardware device and that it cannot be used to present data or information to a user by a process external to the secure hardware device or that it can only be used to present data or information to a user by a process external to the secure hardware device if that is authorized and controlled by the secure hardware device. In some embodiments the secure hardware device has a user input interface that is secure in that it is fully controlled by the secure hardware device and that it cannot be used to obtain data or information from a user by a process external to the secure hardware device or that it can only be used to obtain data or information from a user by a process external to the secure hardware device if that is authorized and controlled by the secure hardware device. In some embodiments the security of the secure user input and output interfaces is maintained by the secure hardware device not allowing any change to its firmware or providing a secure firmware update mechanism that only allows changes to its firmware through a secure protocol that ensures that the secure hardware device accepts only authorised firmware updates from a trusted source.

In some embodiments the token is not a dedicate hardware device. In some embodiments the token may comprise an electronic consumer device the primary purpose of which may not be to provide authentication functionality but which may comprise software for providing the strong authentication token functionality described in this description. For example, in some embodiments the token may comprise a tablet computer or a smartphone comprising an authentication app providing the strong authentication token functionality described in this description.

Form Factor:

In some embodiments the token may comprise a plastic circuit board (PCB) on which at least some of the electronic components comprised in the token may be arranged. Other electronic components may be galvanically connected to components arranged on the circuit board (e.g. by electrical wires). In some embodiments all electronic components of the token are comprised within a single housing. In some embodiments the housing may be made of plastic or of metal or of a combination of materials. In some embodiments the authentication token may be a monolithic device. In the context of this description this means that the digital data processing component for generating the dynamic credentials, the memory component for storing instance data, the input user interface, the output user interface and the data input interface comprised in the authentication token are all comprised into a single physical device. In some embodiments these components cannot be removed by the user as part of the ordinary operation of the authentication token. In some embodiments these components cannot be removed without causing irreversible change to the authentication token. In some embodiments these components cannot be removed without permanent damage to the authentication token.

In some embodiments the token may comprise more than one electronic device whereby the various functionalities of the token may be taken care of by the different devices. For example, in some embodiments the token may comprise a secure element such as a smart card and a reader device, whereby the secure element may take care of storing security sensitive data elements such as secret key related data and/or a passcode-blinding data element. The secure element may further be adapted to take care of some or all of the cryptographic calculations for the generation of a dynamic authentication credential. The reader may for example comprise a user input interface and a user output interface, and a data input interface. The secure element may comprise a data communication interface to communicate with the reader, and the reader may comprise a complementary data communication interface to communicate with the secure element. The secure element and the reader may be adapted to cooperate and to provide together all the functionalities of the token described elsewhere in this description.

Size and Weight:

In some embodiments the token has a weight and spatial measures such that the token can be considered to be a portable, pocket-sized, hand-held device. In some embodiments the reader has a weight and spatial measures such that the token can be sent to the user through mail at moderate costs. For example, in some embodiments the authentication device may have a thickness of less than 2 cm, a width of less than 10 cm, a length of less than 15 cm, and a weight of less than 200 grams. In other embodiments the authentication device may have a thickness of less than 1.5 cm, a width of less than 7 cm, a length of less than 13 cm, and a weight of less than 110 grams. In some embodiments the length and width of the authentication device may exceed the length respectively the width of a standard full size credit card by no more than 10 percent. In some embodiments the authentication device may have the length and width of a standard full size credit card. In some embodiments the authentication device may have the length, width and thickness of a standard full size credit card within the margins applicable for standard full size credit cards (e.g. having the dimensions of an ID-1 sized smart card as specified by ISO/IEC 7810).

Power Source:

In some embodiments the authentication device comprises an autonomous source of electrical power. In some embodiments the power source may comprise a battery. In some embodiments the battery may be replaceable.

Figure 2:
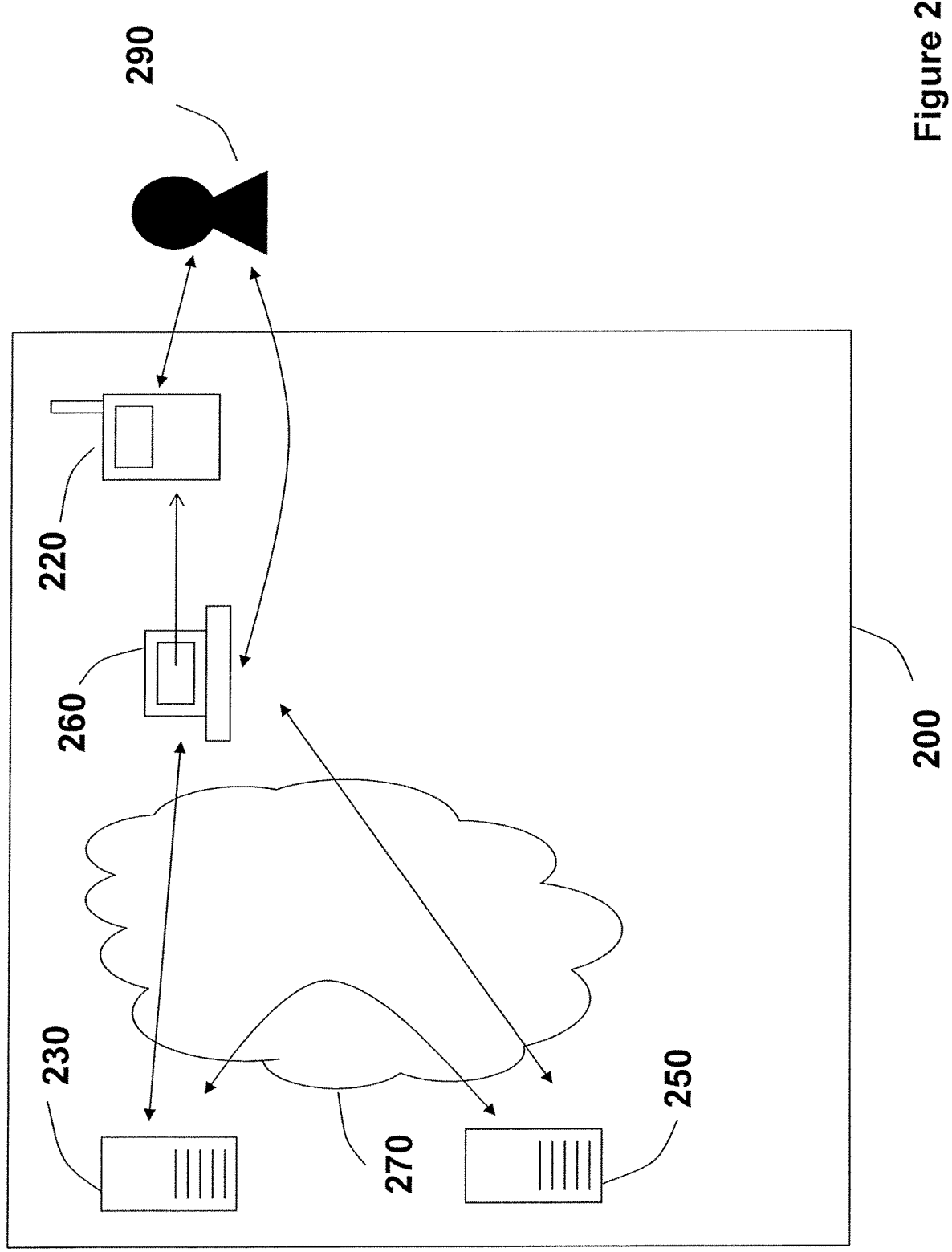
FIG. 2 schematically illustrates an exemplary system according to an aspect of the invention.

FIG. 2 schematically illustrates an exemplary system (200) of the invention according to an aspect of the invention.

In some embodiments the system may comprise a strong authentication token (220), and an authentication server (230). In some embodiments the system may further comprise an application server (250). In some embodiments the system may further comprise an access device (260). In some embodiments the system may further comprise a computer network (270).

In some embodiments the strong authentication token (220) may comprise any of the strong authentication tokens or authentication clients described in more detail elsewhere in this description. In particular, the strong authentication token (220) may comprise the apparatus (100) described in connection to FIG. 1.

In some embodiments the authentication server (230) may comprise any of the authentication servers or credential verification servers or entities described in more detail elsewhere in this description. In some embodiments the authentication server (230) may be adapted to perform any of the method steps or actions performed by any of the authentication servers or credential verification servers or entities described in more detail elsewhere in this description. The authentication server (230) may comprise one or more computing devices such as server computers. In some embodiments the authentication server may be adapted to perform cryptographic calculations. In some embodiments the authentication server may be adapted to verify the validity of a dynamic authentication credential generated by a client or token. In some embodiments the authentication server has access to user and/or token specific information. Such user and/or token specific information may include for example a user identification data element (user id), secret data such as a passcode verifier, key related data to generate or obtain the value of a cryptographic key that the token (presumably) has used to generate the dynamic authentication credential. For example, in some embodiments, the token may generate the cryptographic key as a function of the value of a state variable maintained by the token and the authentication server may have access to a state variable representing the value of the state variable of the token. In some embodiments the authentication server may store these data elements in a database which may be comprised in or connected to the authentication server.

The application server (250) may be adapted to host the server part of a remotely accessible computer based application. The interaction between a user and the remotely accessible computer based application may be secured using the authentication token (220) and the authentication server (230) with any of the authentication methods described in more detail elsewhere in this description. The application server (250) may comprise a web server and the remotely accessible computer based application may be a web based application such as for example a web banking or internet banking application.

The access device (260) may be adapted to allow a user (290) to access and interact with the remotely accessible computer based application hosted by the application server (250). In some embodiments the access device (260) may for example comprise a web browser to interact with the remotely accessible computer based application hosted by the application server (250). In some embodiments the access device (260) may for example comprise a PC, or tablet computer or a smartphone.

In some embodiments the computer network (270) may comprise a LAN (Local Area Network), and/or a WAN (Wide Area Network), and/or the Internet, and/or a wireless data telecommunication network such as for example a mobile phone network. The computer network (270) may link two or more computing devices such as the strong authentication token (220), the authentication server (230), the application server (250) and the access device (260), and it may be adapted to enable these computing devices to communicate with each other and to exchange data and messages such as for example any of the various messages exchanged by any of the authentication clients or authentication tokens and any of the authentication servers described in more detail elsewhere in this description.

Figure 3:
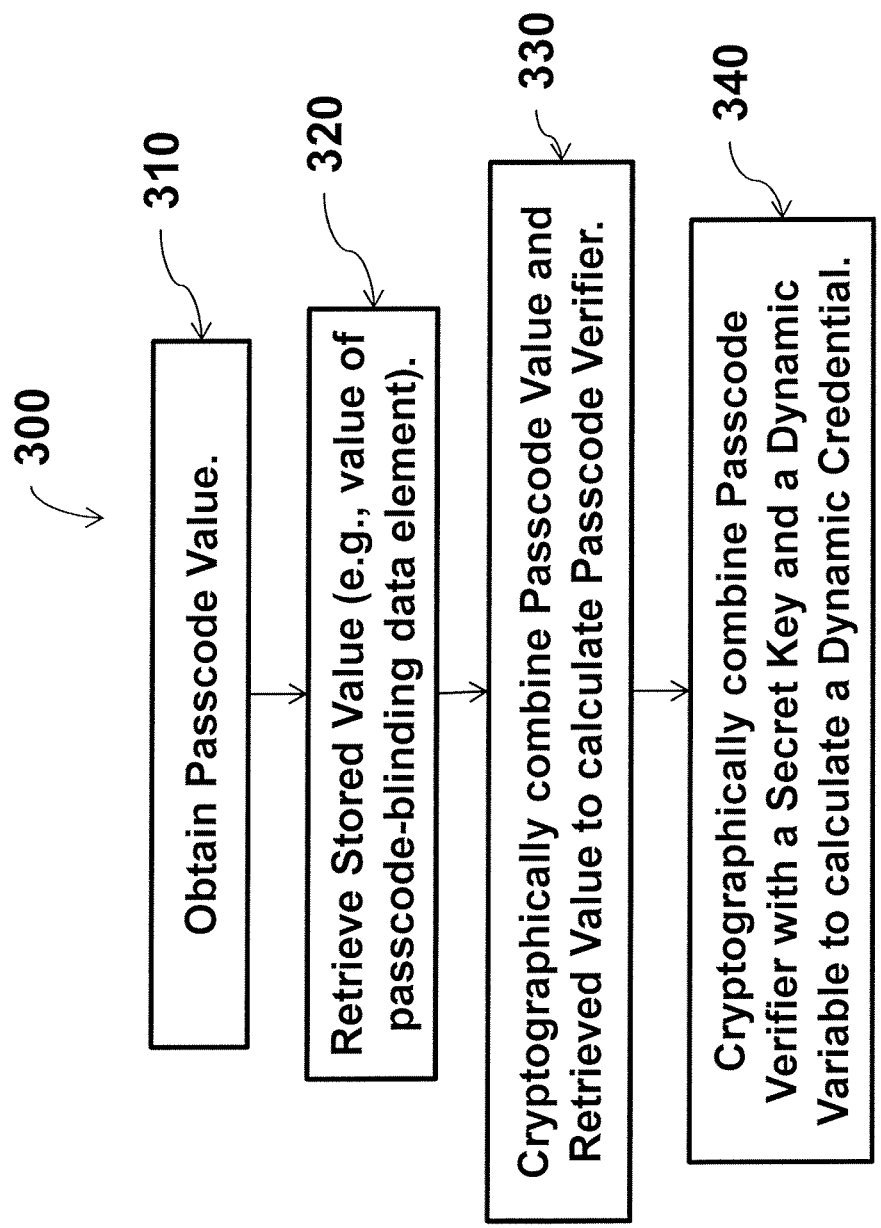
FIG. 3 schematically illustrates an exemplary method according to an aspect of the invention.

FIG. 3 schematically illustrates an exemplary method (300) for generating a dynamic credential.

In some embodiments the method for generating a dynamic credential comprises the following steps: obtaining (310) from a user a passcode value, retrieving (320) a stored value of a passcode-blinding data element, calculating (330) a passcode verifier by cryptographically combining the obtained passcode value and the retrieved value of the passcode-blinding data element, calculating (340) a dynamic credential by cryptographically combining the calculated passcode verifier with a stored secret key and a dynamic variable.

In some embodiments the secret key may comprise the dynamic variable.

In some embodiments the method may further comprise updating the value of the secret key with a new value. In some embodiments the method may comprise: updating a state variable by calculating a new value for the state variable based on the old value of the state variable, erasing the old value of the state variable, erasing the old variable of the key, calculating a new variable for the secret key based on the new value of the state variable.

In one aspect of the invention a method for generating a dynamic authentication credential is provided. In some embodiments some or all steps of the method may be performed by any of the authentication clients or authentication tokens described elsewhere in this description. In some embodiments the method may comprise some or all of the methods of any of the methods for generating a dynamic authentication credential that are described elsewhere in this description. In particular, in some embodiments the method may comprise some or all of the steps of the methods described in connection to FIG. 3.

In some embodiments the method (300) may comprise the steps of: obtaining (310) the value of a passcode, obtaining (320) the value of a passcode-blinding data element, obtaining the value of a dynamic variable, obtaining the value of a cryptographic credential generation key, calculating (330) the value of a passcode verifier data element from the obtained passcode value and the obtained passcode-blinding data element value, calculating (340) the dynamic authentication credential from the calculated passcode verifier data element value, the obtained dynamic variable value and the obtained cryptographic credential generation key value.

In some embodiments obtaining the value of the passcode may comprise receiving the value of the passcode from a user, e.g., as input provided by the user through a user input interface of an authentication token or authentication client device. In some embodiments the passcode value may comprise a PIN (Personal Identification Number) value or a password value.

In some embodiments obtaining the value of the passcode-blinding data element may comprise reading the passcode-blinding data element value from a memory of for example an authentication token or authentication client performing the method. In some embodiments the passcode-blinding data element may have been generated and stored, e.g. in the memory of an authentication token or authentication client performing the method, for example as part of an initialization phase of such an authentication token or authentication client, prior to generating dynamic authentication credentials. In some embodiments the passcode-blinding data element value may be generated as a high entropy data element. For example, in some embodiments the entropy of the passcode-blinding data element may be at least 64 bits; in other embodiments the entropy may be at least 128 bits; in still other embodiments the entropy may be at least 256 bits. In some embodiments the passcode-blinding data element value may be generated using a random or pseudo-random number that may be generated by a random or pseudo-random number generator.

In some embodiments obtaining the dynamic variable value may comprise receiving a message from for example a server, such as an authentication server, and determining the dynamic variable value as a function of a data element, such as a challenge or nonce or transaction data, that is comprised in the received message. In some embodiments obtaining the dynamic variable value may comprise determining the dynamic variable as a function of transaction data and presenting the transaction data to a user for approval and obtaining the user's approval.

In some embodiments calculating the passcode verifier data element value may comprise calculating the passcode verifier data element value as a cryptographic function of the obtained passcode value and the obtained passcode-blinding data element value. In some embodiments calculating the passcode verifier data element value may comprise calculating the passcode verifier data element value as the result of applying an irreversible (cryptographic) function to the obtained passcode value and the obtained passcode-blinding data element value. In some embodiments applying the irreversible function may comprise applying a (secure) cryptographic hash function to a combination of the obtained passcode value and the obtained passcode-blinding data element value. For example, in some embodiments the (secure) cryptographic hash function may comprise one of the SHA-2 or SHA-3 (Secure Hash Algorithm) family of functions. In some embodiments applying the irreversible function may comprise applying a secure cryptographic keyed-hash function to the obtained passcode value using the obtained passcode-blinding data element value as a key for the keyed-hash function. For example, in some embodiments the keyed-hash function may comprise the HMAC (Hash-based Message Authentication Code or keyed-hash message authentication code) function. In some embodiments applying the irreversible function may comprise applying a secure cryptographic encryption (or decryption) function to the obtained passcode value using the obtained passcode-blinding data element value as an encryption (or decryption) key. For example, in some embodiments the encryption function may comprise the AES (Advanced Encryption Standard) encryption algorithm.

In some embodiments calculating the dynamic authentication credential from the calculated passcode verifier data element value, the obtained dynamic variable value and the obtained cryptographic credential generation key value may comprise calculating the dynamic authentication credential as a cryptographic function of the calculated passcode verifier data element value, the obtained dynamic variable value and the obtained cryptographic credential generation key value. In some embodiments calculating the dynamic authentication credential from the calculated passcode verifier data element value, the obtained dynamic variable value and the obtained cryptographic credential generation key value may comprise calculating the dynamic authentication credential as the result of applying an irreversible (cryptographic) function to the calculated passcode verifier data element value, the obtained dynamic variable value and the obtained cryptographic credential generation key value. In some embodiments applying the irreversible function may comprise applying a (secure) cryptographic hash function to a combination of the calculated passcode verifier data element value, the obtained dynamic variable value and the obtained cryptographic credential generation key value. For example, in some embodiments the (secure) cryptographic hash function may comprise one of the SHA-2 or SHA-3 (Secure Hash Algorithm) family of functions. In some embodiments applying the irreversible function may comprise applying a secure cryptographic keyed-hash function to a combination of the calculated passcode verifier data element value and the obtained dynamic variable value using the obtained cryptographic credential generation key value as a key for the keyed-hash function. For example, in some embodiments the keyed-hash function may comprise the HMAC (Hash-based Message Authentication Code or keyed-hash message authentication code) function. In some embodiments applying the irreversible function may comprise applying a (secure) cryptographic encryption (or decryption) function to a combination of the calculated passcode verifier data element value and the obtained dynamic variable value using the obtained cryptographic credential generation key value as an encryption (or decryption) key. For example, in some embodiments the encryption function may comprise the AES (Advanced Encryption Standard) encryption algorithm.

In some embodiments the method may further comprise the step of discarding the obtained passcode value after the step of calculating the passcode verifier data element value. In some embodiments discarding the obtained passcode value may comprise erasing all copies of the obtained passcode value from a memory of for example an authentication token or authentication client performing the method.

In some embodiments the method may further comprise the step of discarding the calculated passcode verifier data element value after the step of calculating the dynamic authentication credential. In some embodiments discarding the calculated passcode verifier data element value may comprise erasing all copies of the calculated passcode verifier data element value from a memory of for example an authentication token or authentication client performing the method.

In some embodiments obtaining the cryptographic credential generation key value may comprise determining the cryptographic credential generation key value as a function of the value of a state variable. In some embodiments the method may further comprise maintaining and storing in memory the value of the state variable. In some embodiments determining the cryptographic credential generation key value as a function of the value of a state variable may comprise reading the state variable value from a memory of for example an authentication token or authentication client performing the method. In some embodiments determining the cryptographic credential generation key value as a function of the value of a state variable may comprise setting the cryptographic credential generation key value to the value of the state variable. In other embodiments determining the cryptographic credential generation key value as a function of the value of the state variable may comprise calculating the cryptographic credential generation key value as the result of applying an irreversible function to the value of the state variable. For example, in some embodiments the irreversible function may comprise a (secure) cryptographic hash function which may comprise one of the SHA-2 or SHA-3 (Secure Hash Algorithm) family of functions. In some embodiments applying the irreversible function may comprise applying a (secure) cryptographic encryption (or decryption) function to a fixed value using the value of the state variable as an encryption (or decryption) key. For example, in some embodiments the encryption function may comprise the AES (Advanced Encryption Standard) encryption algorithm.

In some embodiments the method may further comprise updating the value of the state variable with a new value that is calculated as a function of the present value of the state variable (wherein the present value has become the previous value after the update). In some embodiments calculating the new value of the state variable as a function of the present (previous) value of the state variable may comprise calculating the new value of the state variable as the result of applying an irreversible function to the present (previous) value of the state variable. For example, in some embodiments the irreversible function may comprise a (secure) cryptographic hash function which may comprise one of the SHA-2 or SHA-3 (Secure Hash Algorithm) family of functions. In some embodiments applying the irreversible function may comprise applying a (secure) cryptographic encryption (or decryption) function to a fixed value using the present (previous) value of the state variable as an encryption (or decryption) key. For example, in some embodiments the encryption function may comprise the AES (Advanced Encryption Standard) encryption algorithm.

In some embodiments the method may further comprise discarding the present (previous) value of the state variable after said calculating of the new value of the state variable as a function of the present value of the state variable. In some embodiments the step of discarding the present (previous) value of the state variable may be performed after both the calculating of the new value of the state variable and the determining the cryptographic credential generation key value as a function of the present (previous) value of a state variable have been performed. In some embodiments discarding the present (previous) value of the state variable may comprise erasing all copies of the present (previous) value of the state variable from a memory of for example an authentication token or authentication client performing the method.

In some embodiments the method may further comprise discarding the cryptographic credential generation key value after said calculating the dynamic authentication credential. In some embodiments discarding the cryptographic credential generation key value may comprise erasing all copies of the cryptographic credential generation key value from a memory of for example an authentication token or authentication client performing the method. In some embodiments the method may further comprise discarding, after said calculating the dynamic authentication credential, the value of the state variable from which the cryptographic credential generation key value has been derived. In some embodiments discarding the value of the state variable may comprise erasing all copies of the value of the state variable from a memory of for example an authentication token or authentication client performing the method.

In another aspect of the invention a method for verifying a value of a dynamic authentication credential is provided. In some embodiments some or all steps of the method may be performed by any of the authentication servers described elsewhere in this description. In some embodiments the method may comprise some or all of the steps of any of the methods for verifying a value of a dynamic authentication credential described elsewhere in this description.

In some embodiments the value of the dynamic authentication credential may have been generated by any of the methods for generating a dynamic authentication credential that are described in this description.

Figure 4:
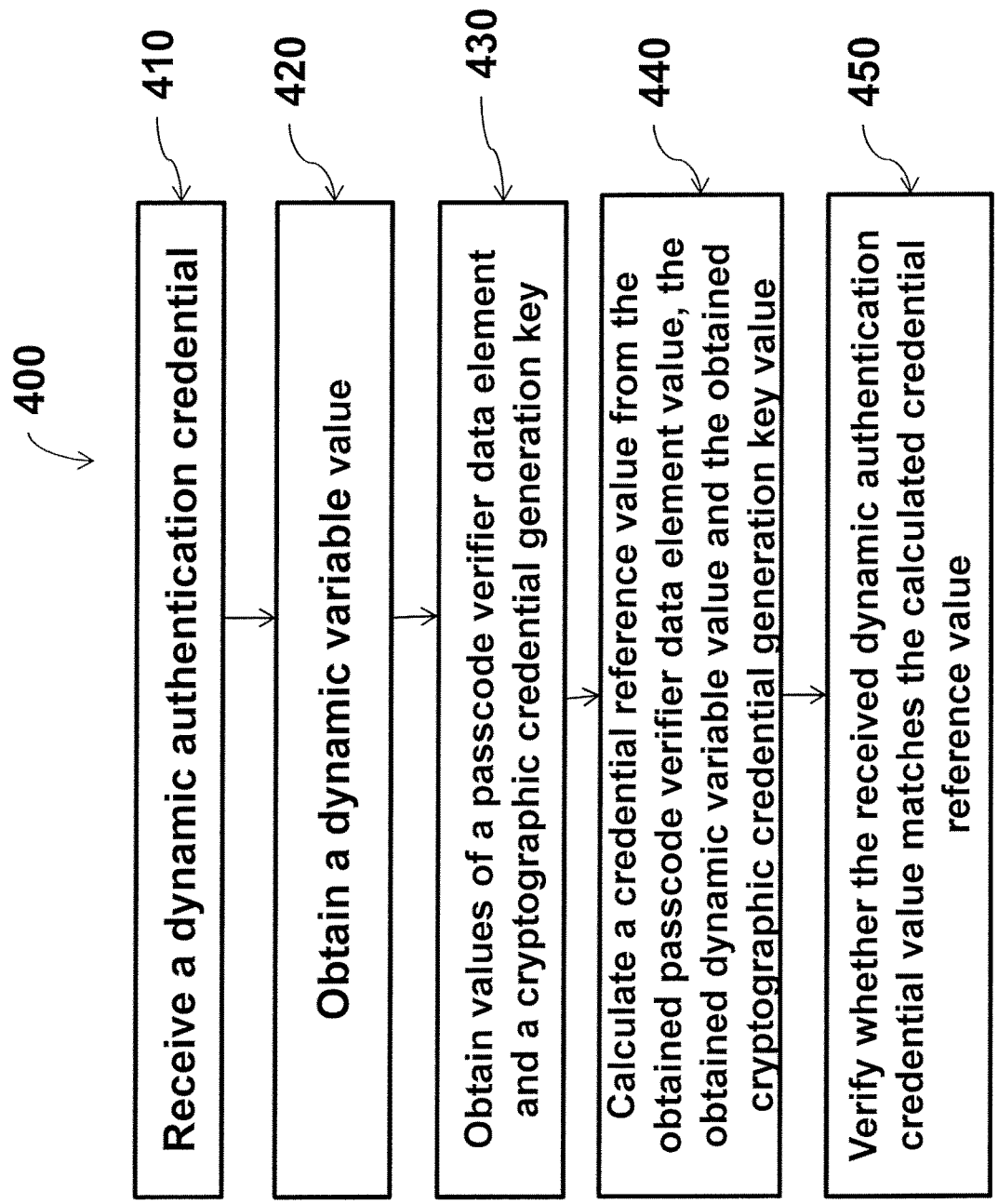
FIG. 4 schematically illustrates an exemplary method for verifying a dynamic authentication credential according to an aspect of the invention.

An exemplary embodiment of the method is illustrated in FIG. 4.

In some embodiments the method (400) may comprise the steps of: receiving (410) the dynamic authentication credential value; obtaining (420) the value of a dynamic variable; obtaining (430) the values of a passcode verifier data element and a cryptographic credential generation key; calculating (440) a credential reference value from the obtained passcode verifier data element value, the obtained dynamic variable value and the obtained cryptographic credential generation key value; and verifying (450) whether the received dynamic authentication credential value matches the calculated credential reference value. In some embodiments the method may further comprise the step of generating a signal indicating whether the received dynamic authentication credential value matches the calculated credential reference value. In some embodiments the dynamic variable may comprise or may be derived from transaction data representative of a transaction to be authorized by the dynamic authentication credential.

In some embodiment calculating (440) the credential reference value from the obtained passcode verifier data element value, the obtained dynamic variable value and the obtained cryptographic credential generation key value may comprise calculating the credential reference value as a cryptographic function of the obtained passcode verifier data element value, the obtained dynamic variable value and the obtained cryptographic credential generation key value. In some embodiments calculating the credential reference value from the obtained passcode verifier data element value, the obtained dynamic variable value and the obtained cryptographic credential generation key value may comprise calculating the credential reference value as the result of applying an irreversible (cryptographic) function to the obtained passcode verifier data element value, the obtained dynamic variable value and the obtained cryptographic credential generation key value. In some embodiments applying the irreversible function may comprise applying a (secure) cryptographic hash function to a combination of the obtained passcode verifier data element value, the obtained dynamic variable value and the obtained cryptographic credential generation key value. For example, in some embodiments the (secure) cryptographic hash function may comprise one of the SHA-2 or SHA-3 (Secure Hash Algorithm) family of functions. In some embodiments applying the irreversible function may comprise applying a secure cryptographic keyed-hash function to a combination of the obtained passcode verifier data element value and the obtained dynamic variable value using the obtained cryptographic credential generation key value as a key for the keyed-hash function. For example, in some embodiments the keyed-hash function may comprise the HMAC (Hash-based Message Authentication Code or keyed-hash message authentication code) function. In some embodiments applying the irreversible function may comprise applying a (secure) cryptographic encryption (or decryption) function to a combination of the obtained passcode verifier data element value and the obtained dynamic variable value using the obtained cryptographic credential generation key value as an encryption (or decryption) key. For example, in some embodiments the encryption function may comprise the AES (Advanced Encryption Standard) encryption algorithm.

In some embodiments verifying whether a first value matches a second value may comprise or may consist of verifying whether the first value is equal to the second value. In some embodiments verifying whether a first value matches a second value may comprise or may consist of verifying whether a first function of the first value is equal to a second function of the second value. For example, in some embodiments verifying whether a first value matches a second value may comprise or may consist of verifying whether a first bit string representation of the first value is equal to a truncated version of a second bit string representation of the second value. In some embodiments verifying whether a first value matches a second value may comprise or may consist of verifying whether a mathematical relation between the first value and the second value is true.

In some embodiments obtaining the values of a passcode verifier data element and a cryptographic credential generation key may comprise obtaining a set of user or authentication client specific data associated with a particular user of authentication client and retrieving or deriving the values of the passcode verifier data element and the cryptographic credential generation key from this set of user or authentication client specific data. In some embodiments the set of user or authentication client specific data is associated with a user of authentication client from which the received dynamic authentication credential value is presumed to have been received. In some embodiments the method may further comprise storing and maintaining the set of user or authentication client specific data in a memory or database which may be comprised in or connected to for example an authentication server performing the steps of the method, and obtaining the set of user or authentication client specific data may comprise reading the set of user or authentication client specific data from this memory or database.

In some embodiments the set of user or authentication client specific data may comprise a value of a state variable and obtaining the cryptographic credential generation key value may comprise determining the cryptographic credential generation key value as a function of the value of the state variable that is comprised in the set of user or authentication client specific data. In some embodiments determining the cryptographic credential generation key value as a function of the value of the state variable may comprise setting the cryptographic credential generation key value to the value of the state variable. In other embodiments determining the cryptographic credential generation key value as a function of the value of the state variable may comprise calculating the cryptographic credential generation key value as the result of applying an irreversible function to the value of the state variable. For example, in some embodiments the irreversible function may comprise a (secure) cryptographic hash function which may comprise one of the SHA-2 or SHA-3 (Secure Hash Algorithm) family of functions. In some embodiments applying the irreversible function may comprise applying a (secure) cryptographic encryption (or decryption) function to a fixed value using the value of the state variable as an encryption (or decryption) key. For example, in some embodiments the encryption function may comprise the AES (Advanced Encryption Standard) encryption algorithm.

In some embodiments the method may further comprise the step of updating the value of the state variable with a new value that is calculated as a function of the value of the state variable that is comprised in the set of user or authentication client specific data and replacing the value of the state variable that is comprised in the set of user or authentication client specific data with this calculated new value. In some embodiments the method may further comprise the step of storing the set of user or authentication client specific data comprising the updated value of the state variable in a memory or database which may be comprised in or connected to for example an authentication server performing the steps of the method. In some embodiments calculating the new value of the state variable as a function of the value of the state variable that is comprised in the set of user or authentication client specific data may comprise calculating the new value of the state variable as the result of applying an irreversible function to the value of the state variable that is comprised in the set of user or authentication client specific data. For example, in some embodiments the irreversible function may comprise a (secure) cryptographic hash function which may comprise one of the SHA-2 or SHA-3 (Secure Hash Algorithm) family of functions. In some embodiments applying the irreversible function may comprise applying a (secure) cryptographic encryption (or decryption) function to a fixed value using the value of the state variable that is comprised in the set of user or authentication client specific data as an encryption (or decryption) key. For example, in some embodiments the encryption function may comprise the AES (Advanced Encryption Standard) encryption algorithm.

In some embodiments the method may further comprise discarding the value of the state variable that is comprised in the set of user or authentication client specific data after said calculating of the new value of the state variable as a function of the value of the state variable that is comprised in the set of user or authentication client specific data. In some embodiments discarding the value of the state variable that is comprised in the set of user or authentication client specific data may comprise erasing all copies of the value of the state variable that is comprised in the set of user or authentication client specific data from a memory or database which may be comprised in or connected to for example an authentication server performing the steps of the method.

In some embodiments the method may further comprise the step of discarding the cryptographic credential generation key value after the step of calculating the credential reference value. In some embodiments discarding the cryptographic credential generation key value may comprise erasing all copies of the cryptographic credential generation key value from a memory or database which may be comprised in or connected to for example an authentication server performing the steps of the method. In some embodiments the method may further comprise the step of discarding, after the step of calculating the credential reference value, the value of the state variable from which the cryptographic credential generation key value has been derived. In some embodiments discarding the value of the state variable from which the cryptographic credential generation key value has been derived may comprise erasing all copies of this value of the state variable from a memory or database which may be comprised in or connected to for example an authentication server performing the steps of the method.

In another aspect of the invention a method for securing a user's interaction with a computer-based application is provided. In some embodiments the method may comprise performing by an authentication token or authentication client some or all steps of any of the methods for generating a dynamic authentication credential described elsewhere in this description, and performing by an authentication server some or all steps of any of the methods for verifying a dynamic authentication credential described elsewhere in this description.

Authentication Stage

In some embodiments the method comprises performing during an authentication stage the steps of: obtaining, by an authentication client, a dynamic variable client value; obtaining, by an authentication client, a cryptographic credential generation key client value; retrieving, by the authentication client, from memory a passcode-blinding data element value; receiving, by the authentication client, a passcode value from the user; calculating, by the authentication client, a passcode verifier data element client value as a first irreversible client function of the retrieved passcode-blinding data element value and the received passcode value; calculating, by the authentication client, a dynamic authentication credential as a second irreversible client function of the obtained dynamic variable client value, the obtained cryptographic credential generation key client value and the calculated passcode verifier data element client value; and, receiving, by an authentication server, the dynamic authentication credential; obtaining, by the authentication server, a dynamic variable server value; obtaining, by the authentication server, a cryptographic credential generation key server value; obtaining, by the authentication server, a passcode verifier data element server value; calculating, by the authentication server, a credential reference value as an irreversible server function of the obtained dynamic variable server value, the obtained cryptographic credential generation key server value and the obtained passcode verifier data element server value; comparing, by the authentication server, the received dynamic authentication credential with the calculated credential reference value to verify whether the received dynamic authentication credential matches the calculated credential reference value. In some embodiments the method may further comprise the step of generating, by the authentication server, a signal indicating whether the received dynamic authentication credential matches the calculated credential reference value. In some embodiments the method may further comprise the step of the computer-based application performing a first action if the received dynamic authentication credential matches the calculated credential reference value and a second action if the received dynamic authentication credential doesn't match the calculated credential reference value.

In some embodiments the dynamic variable client value may be the same as the dynamic variable server value, the cryptographic credential generation key client value may be the same as the cryptographic credential generation key server value, the passcode verifier data element client value may be the same as the passcode verifier data element server value, and the second irreversible client function for calculating the dynamic authentication credential may be substantially the same as the irreversible server function for calculating the credential reference value. In this context, the second irreversible client function for calculating the dynamic authentication credential being substantially the same as the irreversible server function may be understood as meaning that if the second irreversible client function and the irreversible server function are applied to the same set of input data, then the result of applying the second irreversible client function will match the result of applying the irreversible server function.

In some embodiments the dynamic variable client value may be based on transaction data representing a transaction to be authorized by the user and the method may further comprise the steps of representing, by the authentication client, the transaction data to the user and receiving, by the authentication client from the user an approval of the represented transaction data. In some embodiments the step of calculating the dynamic authentication credential may be conditional on the user approving the represented transaction data. In some embodiments the method may further comprise the step of the computer-based application accepting the transaction if the received dynamic authentication credential matches the calculated credential reference value and rejecting the transaction if the received dynamic authentication credential doesn't match the calculated credential reference value.

In some embodiments the method may further comprise performing during the authentication stage the steps of: storing, by the authentication client, a current state variable client value, whereby obtaining, by the authentication client, the cryptographic credential generation key client value may comprise deriving, by the authentication client, the cryptographic credential generation key client value from the stored current state variable client value; calculating, by the authentication client, a new state variable client value, as a third irreversible client function of the current state variable client value; discarding, by the authentication client, the cryptographic credential generation key client value after the calculation of the dynamic authentication credential; discarding, by the authentication client, the current state variable client value after the calculation of the new state variable client value and the derivation of the cryptographic credential generation key client value; storing, by the authentication client, the new state variable client value in place of the discarded current state variable client value; and storing, by the authentication server, a current state variable server value, whereby obtaining, by the authentication server, the cryptographic credential generation key server value may comprise deriving, by the authentication server, the cryptographic credential generation key server value from the stored current state variable server value; calculating, by the authentication server, a new state variable server value, as a second irreversible server function of the current state variable server value; discarding, by the authentication server, the cryptographic credential generation key server value after the calculation of the credential reference value; discarding, by the authentication server, the current state variable server value after the calculation of the new state variable server value and the derivation of the cryptographic credential generation key server value; storing, by the authentication server, the new state variable server value in place of the discarded current state variable server value. In some embodiments the current state variable server value may be the same as the current state variable client value, the new state variable server value may be the same as the new state variable client value, and the second irreversible server function may be the same as the third irreversible client function.

Initialization Stage

In some embodiments the method may further comprise performing during an initialization stage prior to the authentication stage the steps of: generating, by the authentication client, in an unpredictable way the passcode-blinding data element value; storing, by the authentication client, the generated passcode-blinding data element value for subsequent use during the authentication stage; receiving, by the authentication client, an initial passcode value from the user; calculating, by the authentication client, the (initial) passcode verifier data element client value as the first irreversible client function of the passcode-blinding data element value and the received initial passcode value; and receiving, by the authentication server, the calculated (initial) passcode verifier data element client value and storing, by the authentication server, the received (initial) passcode verifier data element client value as the passcode verifier data element server value for subsequent use during the authentication stage.

In some embodiments the method may further comprise performing during the initialization stage the steps of: obtaining, at the authentication client, an initial client value for the state variable client value that is derived from an initial state seed, and storing, at the authentication client, the obtained initial value for the state variable client value as the current state variable client value; and obtaining, at the authentication server, an initial server value for the state variable server value that is also derived from the initial state seed, and storing, at the authentication server, the obtained initial value for the state variable server value as the current state variable server value.

In some embodiments the method may further comprise performing during the initialization stage the steps of: generating or otherwise obtaining an initial state seed; wherein obtaining, at the authentication client, an initial client value for the state variable client value may comprise: obtaining, at the authentication client, the initial state seed, and deriving, at the authentication client, from the initial state seed the initial client value for the state variable client value; and wherein obtaining, at the authentication server, an initial server value for the state variable server value that is also derived from the initial state seed may comprise: obtaining, at the authentication server, the initial state seed, and deriving, at the authentication server, from the initial state seed the initial server value for the state variable server value.

In some embodiments generating the initial state seed may comprise generating the initial state seed as a high entropy value. In some embodiments generating the initial state seed may comprise using a random or pseudo-random number generated by a random or pseudo-random number generator. In some embodiments generating the initial state seed may be performed by a server such as the authentication server or a server associated with the authentication server.

In some embodiments the method may further comprise performing, during the authentication stage, the step of synchronizing the state variable client value and the state variable server value. In some embodiments the step of synchronizing the state variable client value and the state variable server value may comprise receiving, by the authentication client, a synchronization data element indicative of the state variable server value, and updating, by the authentication client, the state variable client value based on the value of the received synchronization data element to synchronize the state variable client value with the state variable server value. In some embodiments the synchronization data element may comprise a counter value, which may for example indicate how many times the state variable server value has been updated. In some embodiments the step of synchronizing the state variable client value and the state variable server value may comprise receiving, by the authentication server, a synchronization data element indicative of the state variable client value, and updating, by the authentication server, the state variable server value based on the value of the received synchronization data element to synchronize the state variable server value with the state variable client value. In some embodiments the synchronization data element may comprise a counter value, which may for example indicate how many times the state variable client value has been updated.

In another aspect of the invention an apparatus for generating a dynamic authentication credential is provided. In some embodiments the apparatus may comprise any of the authentication tokens or authentication clients described elsewhere in this description. In particular, in some embodiments the apparatus may comprise any of the apparatus (100) described in connection to FIG. 1. In some embodiments the apparatus may be adapted to perform any of the methods for generating a dynamic authentication credential described elsewhere in this description.

In some embodiments the apparatus (100) may comprise: a user input interface (120) adapted to receive a passcode from a user of the apparatus; a data processor (150) adapted to perform cryptographic calculations; and a memory (160) for storing a passcode-blinding data element value and a state variable value; whereby the apparatus may be adapted to, in an initialization stage: obtain and store in the memory the passcode-blinding data element value and obtain an initial value for the state variable value and store in the memory the initial value as the current state variable value; and whereby the apparatus may be further adapted to, in an authentication stage: obtain a dynamic variable value; receive through the user input interface the passcode of the user; read from memory the passcode-blinding data element value; calculate a passcode verifier data element value as a first irreversible function of the received passcode and the passcode-blinding data element value; read from memory the current state variable value and derive a cryptographic credential generation key from the current state variable value read from memory; calculate a dynamic authentication credential as a second irreversible function of the obtained dynamic variable value, the calculated passcode verifier data element value and the derived cryptographic credential generation key; discard the derived cryptographic credential generation key after calculating the dynamic authentication credential; generate a new value for the state variable value as a third irreversible function of the current state variable value; and, after the derivation of the cryptographic credential generation key from the current state variable value and the generation of the new value of the state variable value, discard the current state variable value and store the generated new value of the state variable value in place of the current state variable value.

In some embodiments the apparatus may further comprise a user output interface (130) for presenting data to the user.

In some embodiments the apparatus may be further adapted to: receive transaction data representative of a transaction to be approved by the user; present the received transaction data to the user through the user output interface; receive from the user an approval for the presented transaction data through the user input interface. In some embodiments the calculation of the dynamic authentication credential may be conditional on the apparatus receiving the approval of the user of the presented transaction data.

In some embodiments the apparatus may be further adapted to make the generated dynamic authentication credential available for verification by an authentication server. In some embodiments the apparatus may be adapted to present the generated dynamic authentication credential to the user through the user output interface for the user to forward to the authentication server. In some embodiments the apparatus may be adapted to send the generated dynamic authentication credential directly or indirectly to the authentication server.

In some embodiments the apparatus may further comprise a random or pseudo-random number generator and the apparatus may be further adapted to, in the initialization stage, obtain a random or pseudo-random number generated by the random or pseudo-random number generator and obtain the passcode-blinding data element value as a function of the random or pseudo-random number.

In another aspect of the invention an apparatus for verifying a dynamic authentication credential is provided. In some embodiments the apparatus may comprise any of the authentication servers described elsewhere in this description. In some embodiments the apparatus may be adapted to perform any of the methods for verifying a dynamic authentication credential described elsewhere in this description.

In some embodiments the apparatus may comprise: a memory adapted to store at least one data set that is associated with a particular user or a particular authentication client, and a data processing component adapted to perform cryptographic operations; and the apparatus may be adapted to, in an authentication stage: receive a dynamic authentication credential; obtain a dynamic variable server value; read from the memory a data set associated with a particular user or a particular authentication client; obtain from the read data set a cryptographic credential generation key server value; obtain from the read data set a passcode verifier data element server value; calculate a credential reference value as an irreversible server function of the obtained dynamic variable server value, the obtained passcode verifier data element server value and the obtained cryptographic credential generation key server value; compare the received dynamic authentication credential with the calculated credential reference value to verify whether the received dynamic authentication credential matches the calculated credential reference value.

In some embodiments the apparatus may comprise an authentication server and the memory may comprise a database comprised in or accessible by the authentication server.

In some embodiments the apparatus may further be adapted to, in the authentication stage: generate a signal indicating whether the received dynamic authentication credential matches the calculated credential reference value.

In some embodiments the apparatus may be further adapted to store in the memory the passcode verifier data element server value as part of the data set associated with a particular user or a particular authentication client.

In some embodiments the apparatus may be further adapted to store and maintain in the memory a current state variable server value as a part of the data set associated with the particular user or the particular authentication client, and to, in the authentication stage: obtain the current state variable server value from the read data set; determine the cryptographic credential generation key server value as a function of the obtained current state variable server value; discard the cryptographic credential generation key server value after the calculation of the credential reference value; calculate a new state variable server value as a second irreversible server function of the obtained current state variable server value; discard the current state variable server value after the determination of the cryptographic credential generation key server value and the calculation of the new state variable server value; and write in the memory the new state variable server value in place of the current state variable server value as a part of the data set associated with the particular user or the particular authentication client.

In some embodiments the apparatus may be further adapted to, in an initialization stage: receive a passcode verifier data element value and write the received passcode verifier data element value in the memory as the passcode verifier data element server value as part of the data set associated with the particular user or the particular authentication client.

In some embodiments the apparatus may be further adapted to, in an initialization stage: obtain an initial state variable server value and write the initial state variable server value in the memory as the current state variable server value as part of the data set associated with the particular user or the particular authentication client.

In another aspect of the invention a system for securing a user's interaction with a computer-based application is provided. In some embodiments the system may comprise any of the systems described elsewhere in this description. In particular, in some embodiments the system may comprise any of the systems described in connection to FIG. 2. In some embodiments the system may comprise a plurality of any of the authentication tokens or authentication clients described elsewhere in this description, and any of the authentication servers described elsewhere in this description. In some embodiments the system may comprise any of the apparatus for generating a dynamic authentication credential described elsewhere in this description, and any of the apparatus for verifying a dynamic authentication credential described elsewhere in this description. In some embodiments the system may be adapted to perform one or more steps of any of the methods for securing a user's interaction with a computer-based application described elsewhere in this application.

In some embodiments the system (200) may comprise an authentication client (220) and an authentication server (230), whereby the authentication client may comprise: a user input interface (120) adapted to receive a passcode from a user of the authentication client; a client data processor (150) adapted to perform cryptographic calculations; and a client memory (160) for storing a passcode-blinding data element value and a state variable client value; whereby the authentication client may be adapted to, in an initialization stage: obtain and store in the memory the passcode-blinding data element value and obtain an initial client value for the state variable client value and store in the memory the initial client value as the current state variable client value; and whereby the authentication client may be further adapted to, in an authentication stage: obtain a dynamic variable client value; receive through the user input interface the passcode of the user; read from the client memory the passcode-blinding data element value; calculate a passcode verifier data element client value as a first irreversible client function of the received passcode and the passcode-blinding data element value; read from the client memory the current state variable client value and derive a cryptographic credential generation key client value from the current state variable client value read from the client memory; calculate a dynamic authentication credential as a second irreversible client function of the obtained dynamic variable client value, the calculated passcode verifier data element client value and the derived cryptographic credential generation key client value; discard the derived cryptographic credential generation key client value after calculating the dynamic authentication credential; generate a new value for the state variable client value as a third irreversible client function of the current state variable client value; and, after the derivation of the cryptographic credential generation key client value from the current state variable client value and the generation of the new value of the state variable client value, discard the current state variable client value and store the generated new value of the state variable client value in place of the current state variable client value; and whereby the authentication server may comprise: a server memory adapted to store at least one data set that is associated with the user or the authentication client, and a server data processing component adapted to perform cryptographic operations; and whereby the authentication server may be adapted to, in the initialization stage: receive a passcode verifier data element initialization value and write the received passcode verifier data element initialization value in the memory as the passcode verifier data element server value as part of the data set associated with the user or the authentication client; and obtain an initial state variable server value and write the initial state variable server value in the memory as the current state variable server value as part of the data set associated with the user or the authentication client; and whereby the authentication server may be further adapted to, in the authentication stage: receive the generated dynamic authentication credential; obtain a dynamic variable server value; read from the server memory the data set associated with the user or the authentication client; obtain the current state variable server value from the read data set; derive a cryptographic credential generation key server value as a function of the obtained current state variable server value; obtain from the read data set a passcode verifier data element server value; calculate a credential reference value as a first irreversible server function of the obtained dynamic variable server value, the obtained passcode verifier data element server value and the derived cryptographic credential generation key server value; compare the received dynamic authentication credential with the calculated credential reference value to verify whether the received dynamic authentication credential matches the calculated credential reference value; discard the cryptographic credential generation key server value after the calculation of the credential reference value; calculate a new state variable server value as a second irreversible server function of the obtained current state variable server value; discard the current state variable server value after the derivation of the cryptographic credential generation key server value and the calculation of the new state variable server value; and write in the server memory the new state variable server value in place of the current state variable server value as a part of the data set associated with the user or the authentication client.

In some embodiments the dynamic variable may be based on a time value, and the authentication client may be adapted to obtain the dynamic variable client value as a function of a time value of a client clock comprised in the authentication client, and the authentication server may be adapted to obtain the dynamic variable server value as a function of a time value of a server clock comprised in the authentication server, whereby the client clock and the server clock may be synchronized. In some embodiments the dynamic variable may be based on a counter, and the authentication client may be adapted to obtain the dynamic variable client value as a function of a client counter value maintained by the authentication client, and the authentication server may be adapted to obtain the dynamic variable server value as a function of a server counter value maintained by the authentication server, whereby the authentication client and the authentication server may be adapted to synchronize the client counter value and the server counter value. In some embodiments the dynamic variable may be based on a value, such as challenge, and the authentication server may be adapted to generate this value and obtain the dynamic variable server value as a function of this value and send this value to the authentication client, and the authentication client may be adapted to receive this value (e.g., as input provided by the user or comprised in a message received from the authentication server), and obtain the dynamic variable client value as a function of this value. In some embodiments the dynamic variable may be based on transaction data, and the authentication server may be adapted to receive the transaction data, e.g., from an computer-based application handling the transaction, and obtain the dynamic variable server value as a function of the transaction data, and the authentication client may be adapted to receive the transaction data (e.g., as input provided by the user or comprised in a message received from the authentication server or the computer-based application), and obtain the dynamic variable client value as a function of the transaction data.

In some embodiments the system may further comprise an application server adapted to host the computer-based application and the authentication server may further be adapted to, in the authentication stage: signal to the computer-based application whether the received dynamic authentication credential matches the calculated credential reference value; and the computer-based application may be adapted to perform one action if the received dynamic authentication credential matches the calculated credential reference value and another action if the received dynamic authentication credential doesn't match the calculated credential reference value. For example, in some embodiments the computer-based application may grant a login request or may grant the user access to certain data or may authorize the user to perform certain actions or may perform a certain transaction which may have been submitted by the user if the received dynamic authentication credential matches the calculated credential reference value, and the computer-based application may refuse to perform these actions if the received dynamic authentication credential doesn't match the calculated credential reference value.

In some embodiments an irreversible function may comprise a one-way function, i.e., a mathematical function for which it is computationally easy to calculate the result given the input date, but for which it is computationally hard to obtain matching input date given a particular value of the result of the function. Computationally easy may mean in some embodiments that it takes less than 5 seconds on the electronic device that is meant to do the calculations, to obtain the result of the function. Computationally hard may mean in some embodiments that it takes at least a factor of a million more computational effort to obtain matching input date given a particular value of the result of the function than it takes to calculate the result given the input date. Computationally hard may mean in some embodiments that the only known way to obtain matching input date given a particular value of the result of the function is by an exhaustive search. For the purposes of this description, a cryptographic encryption or decryption operation parameterized by a secret key may also be considered to be an irreversible function, since it may be computationally hard to undo an encryption or decryption operation on an input data element if the value of the parameterizing secret key is unknown.

Advantages of Embodiments of the Invention

If a passcode value is stored on some component of an authentication system, it may be compromised by, for example, an attacker capable of accessing the memory of such a component. Since the passcode typically may have a relatively low entropy, it could potentially also be vulnerable to a brute force exhaustive search attack if an attacker obtains the value of a data element that is a function of the passcode.

The invention improves on other methods and systems for securing a user's interaction with a computer-based application that are based on dynamic credentials and use a passcode, in that it protects the confidentiality of the passcode value against various attacks.

Since a dynamic authentication credential is generated as a function of a passcode value, the value of a dynamic authentication credential could be used as a starting point for an exhaustive search attack to retrieve the value of the passcode. However, since the dynamic authentication credential is calculated as an irreversible function of not only the passcode value but also the high entropy passcode-blinding data element value and the high entropy cryptographic credential generation key value, such an exhaustive search attack would be computationally infeasible.

Knowledge of a passcode-blinding data element value and/or a cryptographic credential generation key value by itself do not permit to obtain the value of a passcode, not even by an exhaustive search, since the values of the passcode-blinding data element value and the cryptographic credential generation key value are independent of the value of the passcode. Therefore, because an authentication token or authentication client according to aspects of the invention discards the passcode provided by the user and discards the calculated passcode verifier data element after they have been used for the generation of a dynamic credential, an attacker who gets hold of the contents of the memory of the authentication token or authentication client (and thus may have gotten hold of the stored passcode-blinding data element value) can still not obtain the user's passcode.

Since a passcode verifier data element is generated as a function of a passcode value, the value of a passcode verifier data element could be used as a starting point for an exhaustive search attack to retrieve the value of the passcode. However, since the passcode verifier data element is calculated as an irreversible function of not only the passcode value but also the high entropy passcode-blinding data element value, such an exhaustive search attack would be computationally infeasible. Therefore, knowledge of a passcode verifier data element by itself does not permit to obtain the value of a passcode. Since the cryptographic credential generation key value on the one hand and the values of the passcode and the passcode verifier data element on the other hand are independent of each other, also the combined knowledge of both a passcode verifier data element value and a corresponding cryptographic credential generation key value by itself does not permit to obtain the value of a passcode. Therefore, an attacker who gets hold of a passcode verifier data element value and/or a corresponding cryptographic credential generation key value stored at an authentication server can still not obtain the user's passcode. Since the value of a dynamic authentication credential is fully determined by (and therefore doesn't add any information to) the combination of the values of a passcode verifier data element value and a corresponding cryptographic credential generation key value, even an attacker who has intercepted the value of a dynamic authentication credential and who has got hold of the corresponding passcode verifier data element value and/or the corresponding cryptographic credential generation key value stored at an authentication server can still not obtain the user's passcode.

Since a dynamic authentication credential value is a function of the passcode value, the dynamic variable value, the passcode-blinding data element value and the cryptographic credential generation key value, and since a dynamic variable value could be either easy to obtain or to guess or could have in practice a low entropy, an attacker who could get hold of on the one hand a dynamic authentication credential value and on the other hand both the passcode-blinding data element value and the cryptographic credential generation key value that were used in the generation of that dynamic authentication credential value, could use that dynamic credential value to mount a potentially feasible exhaustive search attack. However, because an authentication token or authentication client according to aspects of the invention discards both any cryptographic credential generation key value and the value of the state variable from which this particular cryptographic credential generation key value may have been derived after it has used that cryptographic credential generation key value to generate a dynamic authentication credential, even an attacker who gets hold of both on the one hand the values of the passcode-blinding data element, the cryptographic credential generation key and the state variable stored in a particular authentication token or authentication client and on the other hand the values of any or all dynamic authentication credentials that had been generated up to that point by that particular authentication token or authentication client, still doesn't have the combination of on the one hand a dynamic authentication credential value and on the other hand both the passcode-blinding data element value and the particular cryptographic credential generation key value that were used in the generation of that dynamic authentication credential value, and therefore could still not mount a feasible exhaustive search attack to retrieve the passcode of the user of that particular authentication token or authentication client.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature may have been disclosed with respect to only one of several implementations, such feature may be combined with one or more other features of the other implementations as may be desired and advantageous for any given or particular application. While various embodiments have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations are possible. Thus, the breadth and scope of the teachings herein should not be limited by any of the above described exemplary embodiments.

The invention claimed is:

1. A method for generating a dynamic authentication credential comprising the steps of:
    obtaining a value of a passcode;
    obtaining a value of a passcode-blinding data element;
    obtaining a value of a dynamic variable;
    obtaining a value of a cryptographic credential generation key;
    calculating a value of a passcode verifier data element from the obtained passcode value and the obtained passcode-blinding data element value;
    calculating the dynamic authentication credential from the calculated passcode verifier data element value, the obtained dynamic variable value and the obtained cryptographic credential generation key value, and
    maintaining and storing a value of a state variable in a memory of an authentication token or authentication client performing the method;
    wherein obtaining the cryptographic credential generation key value comprises reading the value of the state variable from the memory of the authentication token or authentication client performing the method and determining the cryptographic credential generation key value as a function of the value of the state variable.

2. The method of claim 1 wherein obtaining the value of the passcode comprises receiving the value of the passcode from a user.

3. The method of claim 1 wherein obtaining the value of the passcode-blinding data element comprises reading the passcode-blinding data element value from a memory of an authentication token or authentication client performing the method.

4. The method of claim 3 further comprising the steps of: generating the passcode-blinding data element and storing the generated passcode-blinding data element in the memory during an initialization stage prior to calculating the dynamic authentication credential.

5. The method of claim 4 wherein generating the passcode-blinding data element uses a random or pseudo-random number generated by a random or pseudo-random number generator.

6. The method of claim 1 wherein obtaining the dynamic variable value comprises receiving a data message and determining the dynamic variable value as a function of a data element that is comprised in the received data message.

7. The method of claim 1 wherein obtaining the dynamic variable value comprises determining the dynamic variable as a function of transaction data, presenting the transaction data to a user for approval, and obtaining the user's approval.

8. The method of claim 1 wherein calculating the passcode verifier data element value comprises calculating the passcode verifier data element value as an irreversible function of the obtained passcode value and the obtained passcode-blinding data element value.

9. The method of claim 1 wherein calculating the dynamic authentication credential from the calculated passcode verifier data element value, the obtained dynamic variable value and the obtained cryptographic credential generation key value comprises calculating the dynamic authentication credential as an irreversible function of the calculated passcode verifier data element value, the obtained dynamic variable value and the obtained cryptographic credential generation key value.

10. The method of claim 1 further comprising the step of:
    discarding the obtained passcode value after the step of calculating the passcode verifier data element value.

11. The method of claim 10 wherein discarding the obtained passcode value comprises erasing all copies of the obtained passcode value from a memory of an authentication token or authentication client performing the method.

12. The method of claim 1 further comprising the step of:
    discarding the calculated passcode verifier data element value after the step of calculating the dynamic authentication credential.

13. The method of claim 12 wherein discarding the calculated passcode verifier data element value comprises erasing all copies of the calculated passcode verifier data element value from a memory of an authentication token or authentication client performing the method.

14. The method of claim 1 wherein determining the cryptographic credential generation key value as a function of the value of a state variable comprises setting the cryptographic credential generation key value to the value of the state variable.

15. The method of claim 1 wherein determining the cryptographic credential generation key value as a function of the value of the state variable comprises calculating the cryptographic credential generation key value as a result of applying an irreversible function to the value of the state variable.

16. The method of claim 1 further comprising the steps of:
calculating a new value for the state variable as a result of applying an irreversible function to the present value of the state variable; and
updating the value of the state variable with the calculated new value.

17. The method of claim 16 wherein updating the value of the state variable with the calculated new value comprises overwriting the present value of the state variable with the calculated new value in said memory of said authentication token or authentication client performing the method.

18. The method of claim 16 further comprising the step of:
discarding the present value of the state variable after said calculating of said new value of the state variable.

19. The method of claim 16 further comprising the step of:
discarding, after said determining the cryptographic credential generation key value as a function of the value of the state variable and after said calculating of said new value of the state variable, the present value of the state variable.

20. The method of claim 19 wherein discarding the present value of the state variable comprises erasing all copies of the present value of the state variable from said memory of said authentication token or authentication client performing the method.

21. The method of claim 1 further comprising the step of:
discarding the cryptographic credential generation key value after said calculating the dynamic authentication credential.

22. The method of claim 21 wherein discarding the cryptographic credential generation key value comprises erasing all copies of the cryptographic credential generation key value from said memory of said authentication token or authentication client performing the method.

23. A method for securing a user's interaction with a computer-based application comprising:
performing, by an authentication client, during an authentication stage the step of:
generating a dynamic authentication credential by:
obtaining a value of a passcode;
obtaining a value of a passcode-blinding data element;
obtaining a value of a dynamic variable;
obtaining a value of a cryptographic credential generation key;
calculating a value of a passcode verifier data element from the obtained passcode value and the obtained passcode-blinding data element value;
calculating the dynamic authentication credential from the calculated passcode verifier data element client value, the obtained dynamic variable client value and the obtained cryptographic credential generation key client value; and
performing, by an authentication server, during the authentication stage the steps of:
receiving the dynamic authentication credential;
obtaining a dynamic variable server value;
obtaining a cryptographic credential generation key server value;
obtaining a passcode verifier data element server value;
calculating a credential reference value as a first server function of the obtained dynamic variable server value, the obtained cryptographic credential generation key server value, and the obtained passcode verifier data element server value; and
verifying whether the received dynamic authentication credential matches the calculated credential reference value.

24. The method of claim 23, wherein:
said obtaining the value of the passcode-blinding data element comprises retrieving from memory the passcode-blinding data element value;
said obtaining the value of the passcode comprises receiving the passcode value from the user;
said calculating the value of the passcode verifier data element client value from the obtained passcode value and the obtained passcode-blinding data element value comprises calculating the passcode verifier data element client value as a first irreversible client function of the retrieved passcode-blinding data element value and the received passcode value;
said calculating the dynamic authentication credential from the calculated passcode verifier data element client value, the obtained dynamic variable client value, and the obtained cryptographic credential generation key client value comprises calculating the dynamic authentication credential as a second irreversible client function of the obtained dynamic variable client value, the obtained cryptographic credential generation key client value and the calculated passcode verifier data element client value; and
said first server function is an irreversible function.

25. The method of claim 24 further comprising the step of:
generating, by the authentication server, a signal indicating whether the received dynamic authentication credential matches the calculated credential reference value.

26. The method of claim 24 further comprising the step of:
the computer-based application performing a first action if the received dynamic authentication credential matches the calculated credential reference value and a second action if the received dynamic authentication credential doesn't match the calculated credential reference value.

27. The method of claim 24 wherein the dynamic variable client value is the same as the dynamic variable server value, the cryptographic credential generation key client value is the same as the cryptographic credential generation key server value, the passcode verifier data element client value is the same as the passcode verifier data element server value, and the second irreversible client function for calculating the dynamic authentication credential is substantially the same as the first irreversible server function for calculating the credential reference value.

28. The method of claim 24 wherein the dynamic variable client value is based on transaction data representing a transaction to be authorized by the user and the method further comprises the steps of:
representing, by the authentication client, the transaction data to the user; and
receiving, by the authentication client, from the user an approval of the represented transaction data.

29. The method of claim 28 wherein the step of calculating the dynamic authentication credential is conditional on the user approving the represented transaction data.

30. The method of claim 28 further comprising the step of:
the computer-based application accepting the transaction if the received dynamic authentication credential matches the calculated credential reference value and rejecting the transaction if the received dynamic authentication credential doesn't match the calculated credential reference value.

31. The method of claim 24 further comprising:
performing, by the authentication client, during the authentication stage the steps of:
storing a current state variable client value, whereby obtaining the cryptographic credential generation key client value comprises deriving, by the authentication client, the cryptographic credential generation key client value from the stored current state variable client value;
calculating a new state variable client value, as a third irreversible client function of the current state variable client value;
discarding the cryptographic credential generation key client value after the calculation of the dynamic authentication credential;
discarding the current state variable client value after the calculation of the new state variable client value and the derivation of the cryptographic credential generation key client value;
storing the new state variable client value in place of the discarded current state variable client value; and
performing, by the authentication server, during the authentication stage the steps of:
storing a current state variable server value, whereby obtaining, by the authentication server, the cryptographic credential generation key server value comprises deriving, by the authentication server, the cryptographic credential generation key server value from the stored current state variable server value;
calculating a new state variable server value, as a second irreversible server function of the current state variable server value;
discarding the cryptographic credential generation key server value after the calculation of the credential reference value;
discarding the current state variable server value after the calculation of the new state variable server value and the derivation of the cryptographic credential generation key server value;
storing the new state variable server value in place of the discarded current state variable server value.

32. The method of claim 31 wherein the current state variable server value is the same as the current state variable client value, the new state variable server value is the same as the new state variable client value, and the second irreversible server function is the same as the third irreversible client function.

33. The method of claim 31 further comprising the steps of:
performing, by the authentication client, during an initialization stage prior to the authentication stage the steps of:
generating, in an unpredictable way the passcode-blinding data element value;
storing the generated passcode-blinding data element value for subsequent use during the authentication stage;
receiving an initial passcode value from the user; and
calculating the passcode verifier data element client value as the first irreversible client function of the passcode-blinding data element value and the received initial passcode value; and
performing, by the authentication server, during the initialization stage the steps of:

receiving the calculated passcode verifier data element client value; and
storing the received passcode verifier data element client value as the passcode verifier data element server value for subsequent use during the authentication stage.

34. The method of claim 33 further comprising performing during the initialization stage the steps of:
obtaining, at the authentication client, an initial client value for the state variable client value that is derived from an initial state seed;
storing, at the authentication client, the obtained initial value for the state variable client value as the current state variable client value;
obtaining, at the authentication server, an initial server value for the state variable server value that is derived from the initial state seed; and
storing, at the authentication server, the obtained initial value for the state variable server value as the current state variable server value.

35. The method of claim 31 further comprising the step of:
synchronizing the state variable client value and the state variable server value during the authentication stage.

36. An apparatus for generating a dynamic authentication credential comprising:
a user input interface is adapted to obtain a value of a passcode from a user of the apparatus;
a data processor adapted to perform cryptographic calculations; and
a memory adapted to store a value of a passcode blinding element and a value of a state variable;
wherein the apparatus is adapted to, in an authentication stage, generate a dynamic authentication credential by;
obtaining the value of the passcode;
obtaining the value of the passcode-blinding data element;
obtaining a value of a dynamic variable;
obtaining a value of a cryptographic credential generation key;
calculating a value of a passcode verifier data element from the obtained passcode value and the obtained passcode-blinding data element value;
calculating the dynamic authentication credential from the calculated passcode verifier data element value, the obtained dynamic variable value and the obtained cryptographic credential generation key value,
wherein the apparatus is further adapted to, in an initialization stage, obtain and store in the memory the passcode-blinding data element value and obtain an initial value for the value of the state variable and store in the memory the initial value as a current state variable value; and
wherein the apparatus is further adapted to, in the authentication stage;
receive through the user input interface the passcode of the user; read from memory the passcode-blinding data element value; calculate the passcode verifier data element value as a first irreversible function of the received passcode and the passcode-blinding data element value; read from memory the current state variable value and derive the cryptographic credential generation key from the current state variable value read from memory; calculate the dynamic authentication credential as a second irreversible function of the obtained dynamic variable value, the calculated passcode verifier data element value and the derived cryptographic credential generation key; discard the derived cryptographic credential generation key after calculating the dynamic authentication credential; generate a new value for the state variable value as a third irreversible function of the current state variable value; and, after the derivation of the cryptographic credential generation key from the current state variable value and the generation of the new value of the state variable value, discard the current state variable value and store the generated new value of the state variable value in place of the current state variable value.

37. The apparatus of claim 36 further comprising:
a user output interface for presenting data to the user.

38. The apparatus of claim 37 further adapted to: receive transaction data representative of a transaction to be approved by the user; present the received transaction data to the user through the user output interface; receive from the user an approval for the presented transaction data through the user input interface.

39. The apparatus of claim 38 wherein the calculation of the dynamic authentication credential is conditional on the apparatus receiving the approval of the user of the presented transaction data.

40. The apparatus of claim 37 further adapted to make the generated dynamic authentication credential available for verification by an authentication server.

41. The apparatus of claim 40 further adapted to present the generated dynamic authentication credential to the user through the user output interface for the user to forward to the authentication server.

42. The apparatus of claim 40 further adapted to send the generated dynamic authentication credential directly or indirectly to the authentication server.

43. The apparatus of claim 36 further comprising:
a random or pseudo-random number generator, and the apparatus further adapted to, in the initialization stage, obtain a random or pseudo-random number generated by the random or pseudo-random number generator and obtain the passcode-blinding data element value as a function of the random or pseudo-random number.

44. A system for securing a user's interaction with a computer-based application comprising:
an authentication client; and
an authentication server;
whereby the authentication client comprises,
    a user input interface adapted to obtain a value of a passcode from a user of the authentication client;
    a data processor adapted to perform cryptographic calculations; and
    a memory adapted to store a value of a passcode-blinding data element and a value of a state variable;
    wherein the authentication client is adapted to, in an authentication stage, generate a dynamic authentication credential by;
        obtaining the value of the passcode;
        obtaining the value of the passcode-blinding data element;
        obtaining a value of a dynamic variable;
        obtaining a value of a cryptographic credential generation key;
        calculating a value of a passcode verifier data element from the obtained passcode value and the obtained passcode-blinding data element value;
        calculating the dynamic authentication credential from the calculated passcode verifier data element value, the obtained dynamic variable value and the obtained cryptographic credential generation key value,
    wherein the authentication client is further adapted to, in an initialization stage, obtain and store in the memory the passcode-blinding data element value and obtain an initial value for the value of the state variable and store in the memory the initial value as a current state variable value; and
    wherein the authentication client is further adapted to, in the authentication stage;
    receive through the user input interface the passcode of the user; read from memory the passcode-blinding data element value; calculate the passcode verifier data element value as a first irreversible function of the received passcode and the passcode-blinding data element value; read from memory the current state variable value and derive the cryptographic credential generation key from the current state variable value read from memory; calculate the dynamic authentication credential as a second irreversible function of the obtained dynamic variable value, the calculated passcode verifier data element value and the derived cryptographic credential generation key; discard the derived cryptographic credential generation key after calculating the dynamic authentication credential; generate a new value for the state variable value as a third irreversible function of the current state variable value; and, after the derivation of the cryptographic credential generation key from the current state variable value and the generation of the new value of the state variable value, discard the current state variable value and store the generated new value of the state variable value in place of the current state variable value; and
whereby the authentication server comprises:
a server memory adapted to store a data set that is associated with the user or the authentication client, and
a server data processing component adapted to perform cryptographic operations; and
whereby the authentication server is adapted to, in the initialization stage:
receive a passcode verifier data element initialization value and write the received passcode verifier data element initialization value in the memory as a passcode verifier data element server value as part of the data set associated with the user or the authentication client; and obtain an initial state variable server value and write the initial state variable server value in the memory as a current state variable server value as part of the data set associated with the user or the authentication client; and
whereby the authentication server is further adapted to, in the authentication stage:
receive the generated dynamic authentication credential; obtain a dynamic variable server value; read from the server memory the data set associated with the user or the authentication client; obtain the current state variable server value from the read data set; derive a cryptographic credential generation key server value as a function of the obtained current state variable server value; obtain from the read data set the passcode verifier data element server value; calculate a credential reference value as a first irreversible server function of the obtained dynamic variable server value, the obtained passcode verifier data element server value and the derived cryptographic credential generation key server value; verify whether the received dynamic authentication credential matches the calculated credential reference value; discard the cryptographic credential generation key server value after the calculation of the credential reference value; calculate a new state variable server value as a second irreversible server function of the obtained current state variable server value; discard the current state variable server value after the derivation of the cryptographic credential generation key server value and the calculation of the new state variable server value; and write in the server memory the new state variable server value in place of the current state variable server value as a part of the data set associated with the user or the authentication client.

45. The system of claim 44 further comprising:
an application server adapted to host the computer-based application;
wherein the authentication server is further adapted to, in the authentication stage: signal to the computer-based application whether the received dynamic authentication credential matches the calculated credential reference value;
and wherein the computer-based application is adapted to perform one action if the received dynamic authentication credential matches the calculated credential reference value and another action if the received dynamic authentication credential doesn't match the calculated credential reference value.

* * * * *